the(12) United States Patent
Kobayashi

(10) Patent No.: US 7,742,693 B2
(45) Date of Patent: Jun. 22, 2010

(54) INTERCHANGEABLE LENS TYPE DIGITAL CAMERA

(75) Inventor: Kazuya Kobayashi, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 236 days.

(21) Appl. No.: 12/148,672

(22) Filed: Apr. 21, 2008

(65) Prior Publication Data

US 2008/0267601 A1 Oct. 30, 2008

(30) Foreign Application Priority Data

Apr. 27, 2007 (JP) ............................. 2007-119282

(51) Int. Cl.
G03B 13/22 (2006.01)
G03B 3/10 (2006.01)
G03B 17/00 (2006.01)

(52) U.S. Cl. .................. 396/91; 396/103; 396/133; 396/530; 348/353

(58) Field of Classification Search .................. 396/91, 396/93, 103, 133, 529, 530; 348/345, 353, 348/354, 361
See application file for complete search history.

(56) References Cited

U.S. PATENT DOCUMENTS

2005/0168622 A1* 8/2005 Kawai et al. ................ 348/360
2008/0118238 A1* 5/2008 Sogawa et al. .............. 396/128

FOREIGN PATENT DOCUMENTS

JP 7-43605 A 2/1995
JP 2006-23653 A 1/2006

* cited by examiner

*Primary Examiner*—W. B. Perkey
*Assistant Examiner*—Dennis Hancock
(74) *Attorney, Agent, or Firm*—Frishauf, Holtz, Goodman & Chick, P.C.

(57) ABSTRACT

An interchangeable lens type digital camera includes a camera main body and an interchangeable lens. The camera main body includes a control section which communicates with an interchangeable lens, and controls focus adjustment of the interchangeable lens by a hill-climbing AF system. A judgment section judges a characteristic of the interchangeable lens on the basis of communication between the interchangeable lens and the control section. The interchangeable lens includes a focus lens for performing focus adjustment. A focus lens drive section drives the focus lens. A lens control section communicates with the control section, and controls the focus lens drive section to perform focus adjustment. The control section changes a previously determined drive enabled range of the focus lens on the basis of a judgment result of the judgment section to perform focus adjustment of the interchangeable lens.

17 Claims, 16 Drawing Sheets

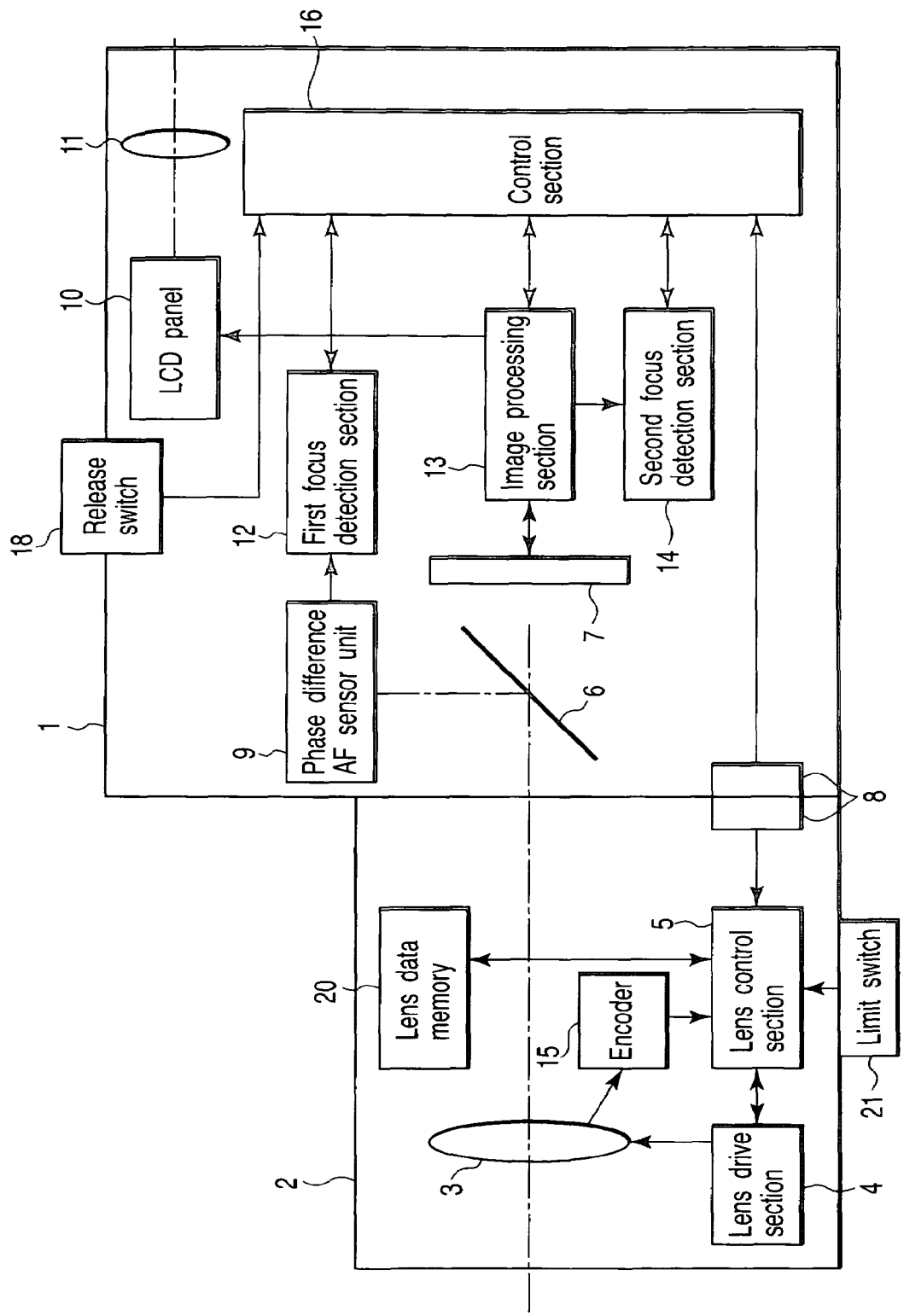
F I G. 18

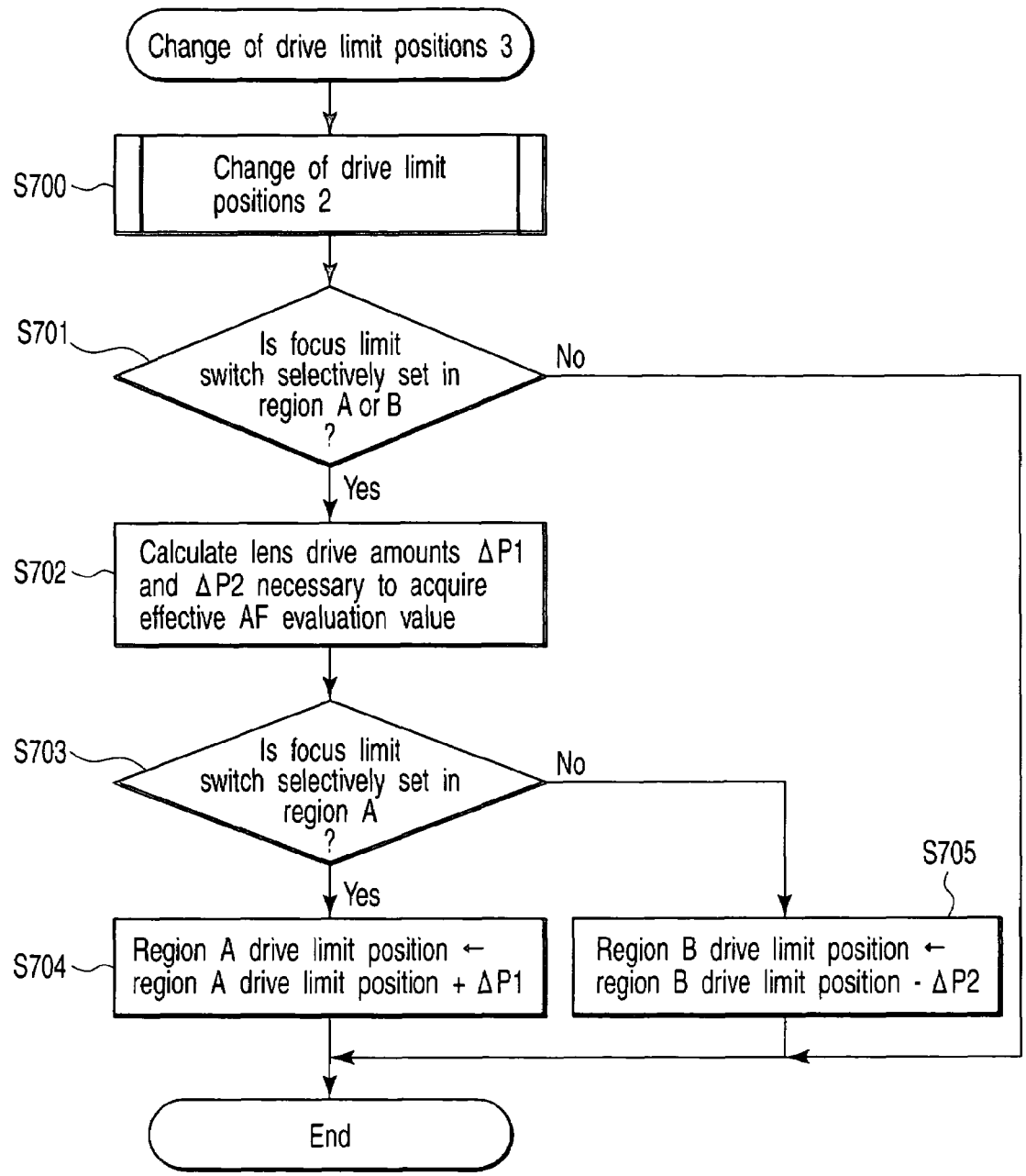
F I G. 20

US 7,742,693 B2

INTERCHANGEABLE LENS TYPE DIGITAL CAMERA

CROSS-REFERENCE TO RELATED APPLICATIONS

This application is based upon and claims the benefit of priority from prior Japanese Patent Application No. 2007-119282, filed Apr. 27, 2007, the entire contents of which are incorporated herein by reference.

BACKGROUND OF THE INVENTION

1. Field of the Invention

The present invention relates to an interchangeable lens type digital camera, and more particularly, to an interchangeable lens type digital camera provided with an automatic focusing control device.

2. Description of the Related Art

Heretofore, as an autofocus (AF) mechanism of an AF single-lens reflex camera of an interchangeable lens type which uses a silver halide film or is of a digital type, a through-the-lens (TTL) phase difference AF mechanism is used in many cases. In the TTL phase difference AF system, a defocus detection mechanism for AF is provided in the camera main body. Further, a focus lens in the interchangeable lens is driven by a motor inside the lens or inside the camera on the basis of a defocus amount detected by the defocus detection mechanism, whereby a focusing control operation is performed. Further, in a compact digital camera, video camera, and the like, so-called hill-climbing AF for performing contrast detection by using high-frequency components of a signal of an image pickup device is often employed. The TTL phase difference AF and the hill-climbing AF have their own characteristics; for example, the TTL phase difference AF is characterized by its higher speed, and the hill-climbing AF is characterized by its higher accuracy. Thus, the TTL phase difference AF and the hill-climbing AF are used for their appropriate purposes.

As a technique associated with AF in which the TTL phase difference AF and the hill-climbing AF are combined with each other, in, for example, Jpn. Pat. Appln. KOKAI Publication No. 7-43605, a technique for performing focusing control by combining the hill-climbing AF and the TTL phase difference AF with each other is disclosed. That is, in Jpn. Pat. Appln. KOKAI Publication No. 7-43605, coarse focusing control is performed by using the phase difference AF, and thereafter fine focusing control is performed by using the hill-climbing AF. Further, in Jpn. Pat. Appln. KOKAI Publication No. 2006-23653, it is disclosed that a drive control sequence, more specifically, drive direction or the like of a focus lens is changed depending on whether the in-focus position detected by the TTL phase difference AF is within a scan drive range of the hill-climbing AF or out of the scan drive range of the hill-climbing AF.

BRIEF SUMMARY OF THE INVENTION

According to an aspect of the invention, there is provided an interchangeable lens type digital camera comprising: a camera main body including: a control section which communicates with an interchangeable lens, and controls focus adjustment of the interchangeable lens by a hill-climbing AF system; and a judgment section which judges a characteristic of the interchangeable lens on the basis of communication between the interchangeable lens and the control section, an interchangeable lens detachable from the camera main body including: a focus lens for performing focus adjustment; a focus lens drive section which drives the focus lens; and a lens control section which communicates with the control section, and controls the focus lens drive section to perform focus adjustment, wherein the control section changes a previously determined drive enabled range of the focus lens on the basis of a judgment result of the judgment section to perform focus adjustment of the interchangeable lens.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 18 is a block diagram showing the configuration of an interchangeable lens type digital camera provided with a focus limit switch;

FIG. 20 is a flowchart of the drive limit position change 3 in the third embodiment of the present invention.

DETAILED DESCRIPTION OF THE INVENTION

Embodiments of the present invention will be described below with reference to the accompanying drawings.

First Embodiment

Figure 1:
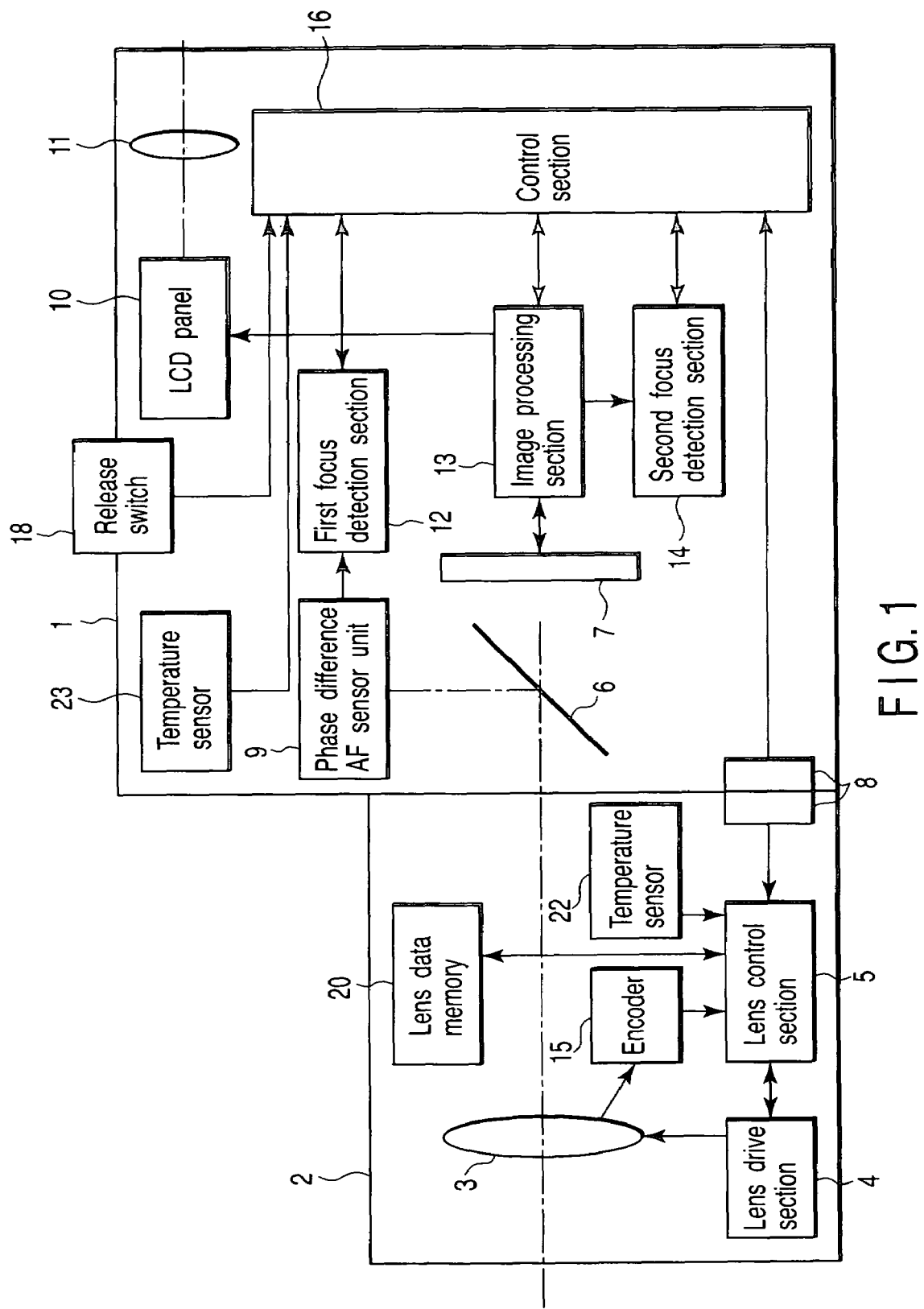
FIG. 1 is a block diagram showing the overall configuration of an interchangeable lens type digital camera according to a first embodiment of the present invention.

FIG. 1 is a block diagram showing the overall configuration of an interchangeable lens type digital camera according to a first embodiment of the present invention. The interchangeable lens type digital camera shown in FIG. 1 includes a camera body 1 and an interchangeable lens 2.

The interchangeable lens 2 includes a focus lens 3, a lens drive section 4, a lens control section 5, a lens contact point section 8, an encoder 15, a lens data memory 20, and a temperature sensor 22. The focus lens 3 is a lens included in imaging lenses of the interchangeable lens 2. Focus adjustment of the imaging lenses is performed by the movement of the focus lens 3. The lens drive section 4 moves the focus lens 3 in the optical axis direction thereof. When the interchangeable lens 2 is mounted on the camera body 1, the lens control section 5 is connected to the camera body 1 so that it can freely communicate with the camera body 1, and controls the lens drive section 4.

The lens contact point section 8 is connected to a lens contact point section 8 provided in the camera body 1. At this time, the lens contact point sections 8 connect a communication line and the like between a control section 16 in the camera body 1 and the lens control section 5 in the interchangeable lens 2. The lens contact point section 8 includes a plurality of contact points for connecting a signal line for supplying power for the lens from the camera body 1 to the interchangeable lens 2, and signal lines for clock/data signals for communication and a vertical synchronizing signal.

The encoder 15 generates a pulse signal in accordance with the movement of the focus lens 3, and outputs the pulse signal to the lens control section 5. By counting the pulse signals output from the encoder 15, the lens control section 5 recognizes the position of the focus lens 3.

The lens data memory 20 stores therein information such as a lens type of the interchangeable lens 2 to be described later in detail, infinity side/closest vicinity side drive limit positions, a focal distance, an imaging-enabled distance, a motor type, and the like, and various data such as various correction values associated with AF. The temperature sensor 22 is connected to the lens control section 5, and is used to measure an environmental temperature.

The camera body 1 includes a half mirror 6, an image pickup device 7, a phase difference AF sensor unit 9, an LCD panel 10, a finder optical system 11, a first focus detection section 12, an image processing section 13, a second focus detection section 14, a control section 16, a release switch (SW) 18, and a temperature sensor 23.

The half mirror 6 divides the subject light flux from the interchangeable lens 2 into a light flux directed to the image pickup device 7 and a light flux directed to the phase difference AF sensor unit 9. The image pickup device 7 converts the transmission light flux from the half mirror 6 into an electric signal, and outputs the signal to the image processing section 13. The phase difference AF sensor unit 9 pupil-divides the reflected light flux from the half-mirror 6, and converts the pupil-divided light fluxes into electrical signals (image signals), and outputs the electrical signals to the first focus detection section 12. With such a configuration, an imaging operation and a phase difference AF detection operation can be performed simultaneously.

The LCD panel 10 is a display panel for an electronic view finder in which a backlight is incorporated. The finder optical system 11 is an optical system for observing an image displayed on the LCD panel 10. The first focus detection section 12 calculates a defocused amount and the like from an output of the phase difference AF sensor unit 9. The image processing section 13 subjects an output signal from the image pickup device 7 to various items of signal processing to generate an image to be picked up and an image for the finder. In the signal processing, white balance correction processing, Y processing, color matrix processing and the like are included. The image for the finder generated by the image processing section 13 is sent to the LCD panel 10, and is displayed on the LCD panel 10. Further, the image for the finder is observed through the finder optical system 11. Further, the image processing section 13 also performs processing for extracting contrast information of the image in order to execute the hill-climbing AF. Further, the image processing section 13 generates a drive control signal of the image pickup device 7 on the basis of a reference clock (not shown) transmitted from the control section 16. For example, the image processing section 13 generates clock signals such as an integration start/end (exposure start/end) timing signal, read control signal (a horizontal synchronizing signal, a vertical synchronizing signal, a transfer signal, or the like) of a light reception signal of each pixel, and outputs the generated signals to the image pickup device 7. Further, the vertical synchronizing signal (hereinafter referred to as the vertical synchronizing signal VD) is also output to the second focus detection section 14, the control section 16, and the lens control section 5. However, the vertical synchronizing signal is output to the lens control section 5 through the lens contact point sections 8 as a signal VDP coinciding with the vertical synchronizing signal VD.

The second focus detection section 14 outputs an AF evaluation value by judging the history of contrast information obtained from the image processing section 13. Here, a focus detection region, which is a region for calculating the AF evaluation value, is a plurality of regions in the screen coinciding with focus detection regions of phase difference detection.

The control section 16 provided with a function for operating as a control section and a judgment section controls the entirety of the camera body 1. Further, the control section 16 is connected to the lens control section 5 so that it can freely communicate with the lens control section 5 when the interchangeable lens 2 is mounted on the camera body 1. Further, the control section 16 includes a memory, and stores various correction data in the memory. The release switch 18 is a switch a state of which is changed in accordance with depression of a release button. This release switch 18 is constituted of a first release switch (1RSW) and a second release switch (2RSW). Further, when the release button is pressed halfway down, the first release switch 1RSW is turned on, and an imaging operation such as an AF and AE is executed. When the release button is pressed fully down, the second release switch 2RSW is turned on, and an imaging operation is executed. An image obtained by the imaging operation is stored in a nonvolatile memory or the like in the control section 16. The temperature sensor 23 is connected to the control section 16 to measure an environmental temperature.

Figure 2:
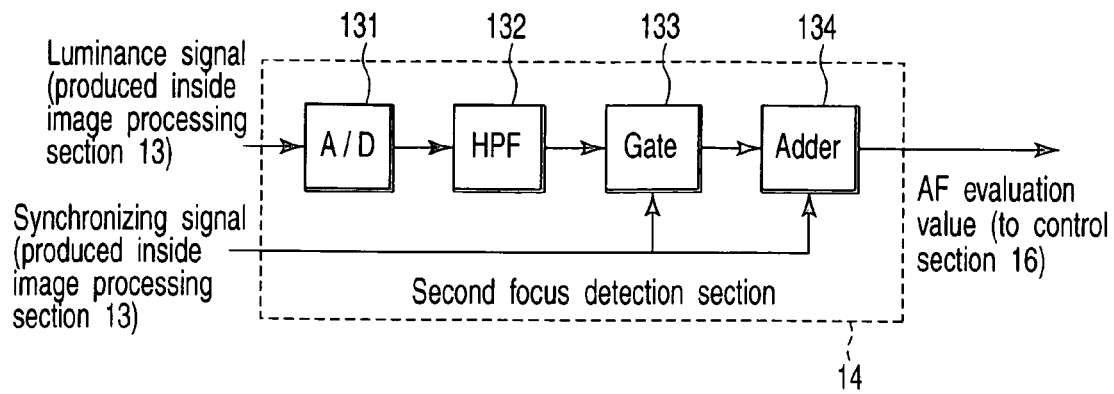
FIG. 2 is a block diagram showing the inner configuration of a second focus detection section.
Figure 3:
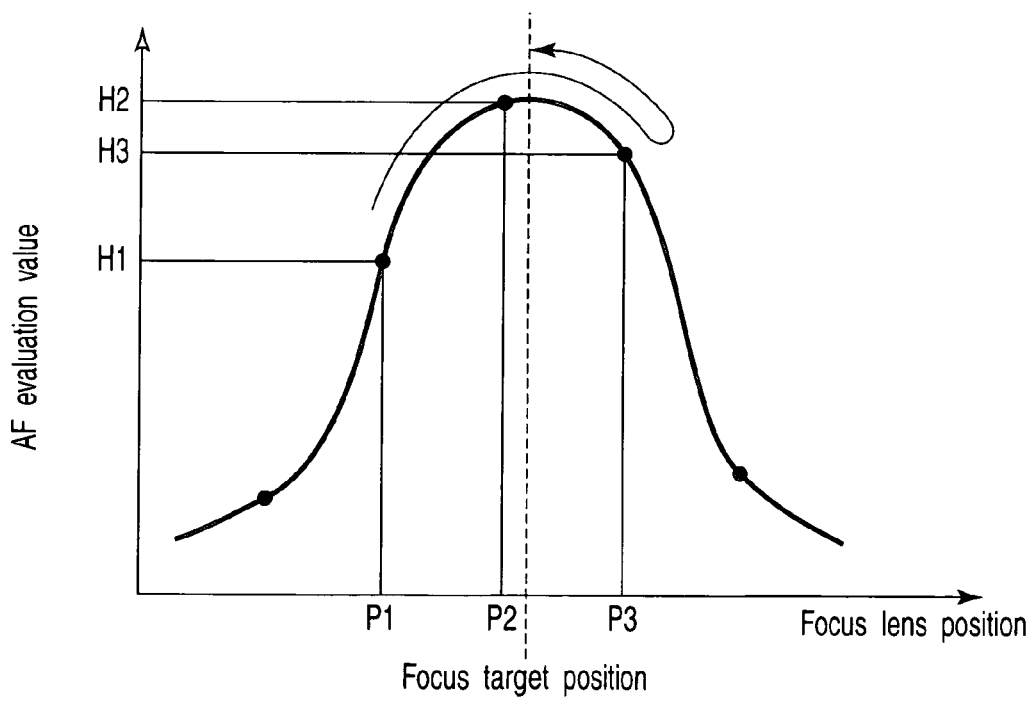
FIG. 3 is a view for explaining a concept of hill-climbing AF showing a relationship between a focus lens position and an AF evaluation value.

Next, the hill-climbing AF will be described below in detail. FIG. 2 is a block diagram showing the inner configuration of a second focus detection section 14. FIG. 3 is a view for explaining a concept of hill-climbing AF showing a relationship between a focus lens position and an AF evaluation value.

As shown in FIG. 2, various circuit blocks for obtaining an AF evaluation value are included in the second focus detection section 14. In the second focus detection section 14 shown in FIG. 2, an A/D converter 131, a high-pass filter (HPF) 132, a focus detection area selection gate 133, and an adder 134 are connected in the order mentioned. The image processing section 13 outputs a luminance signal produced by subjecting an image signal from the image pickup device 7 to Y processing (processing of multiplying the R, G, and B components of the image signal by a predetermined coefficient, and adding up the multiplied resultants) to the A/D converter 131. Further, the image processing section 13 outputs a synchronizing signal together with the luminance signal to the focus detection area selection gate 133, the adder 134, and the control section 16.

The A/D converter 131 converts the luminance signal into a digital signal. The HPF 132 extracts high frequency components included in the luminance signal converted by the A/D converter 131 into a digital signal. The higher the sharpness of the image is, the more the amount of the high frequency components contained in the luminance signal is, and hence it is possible, by integrating the high frequency components extracted by the HPF 132, to digitize the degree of the sharpness of an average image in the integration range. The high frequency components passed through the HPF 132 are input to the focus detection area selection gate 133. The focus detection area selection gate 133 is a circuit for extracting only signals corresponding to a plurality of focus detection areas on the imaging screen. As a result of this, only information on the subject imaged on the focus detection areas is extracted.

The digital signals extracted by the focus detection area selection gate 133 are input to the adder 134, and digital signals for one field are accumulated. The accumulated value is input to the control section 16 as an AF evaluation value indicating the sharpness of the image. The control section 16 performs the known hill-climbing AF by using the AF evaluation value.

When the hill-climbing AF is performed, the control section 16 transmits a lens drive command including a drive amount and a drive direction of the focus lens 3 to the lens control section 5 in the interchangeable lens 2. Further, the lens control section 5 drives the focus lens 3 on the basis of the received lens drive amount and the drive direction. Further, the lens control section 5 acquires position information on the focus lens 3 through the encoder 15, and transmits the position information to the control section 16.

In this manner, the control section 16 acquires the focus lens position information by causing the focus lens 3 to perform the hill-climbing operation, and obtains an AF evaluation value curve shown in FIG. 3 by receiving the AF evaluation value from the adder 134. The AF evaluation value curve is a curve indicating a relationship between the focus lens position P and the AF evaluation value H. In FIG. 3, three points; (P1, H1), (P2, H2), and (P3, H3) on the AF evaluation value curve are shown. The control section 16 detects a position (P2, H2) at which the AF evaluation value becomes the maximum, and obtains the true peak position of the AF evaluation value which is obtained from a plurality of AF evaluation values by an interpolation operation as a focus target position. After this, the control section 16 moves the focus lens 3 to the focus target position. The focus lens 3 can be moved within a region between the infinite end (infinity side drive limit position) and the closest vicinity end (closest vicinity side drive limit position).

The AF evaluation value need not be obtained by accumulating digital signals in all the focus detection areas. For example, it is possible to employ focus detection areas selected from a plurality of focus detection areas on the basis of a predetermined selection algorithm (for example, closest vicinity selection), or employ focus detection areas selected by the photographer. Given above is an outline of the hill-climbing AF.

Figure 4:
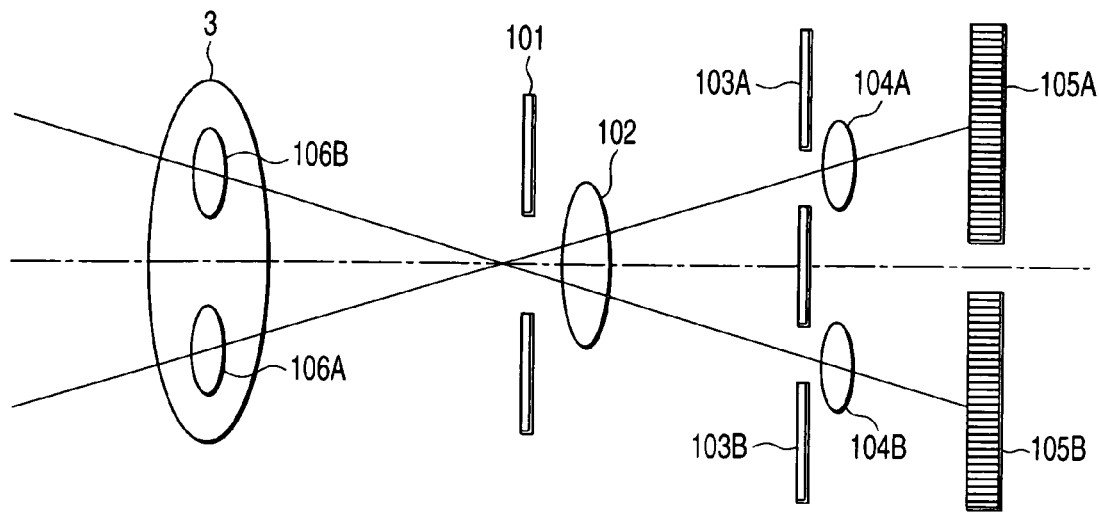
FIG. 4 is a view showing the configuration of a phase difference AF sensor unit.

Next, the TTL phase difference detection will be described below. FIG. 4 is a view showing the configuration of the phase difference AF sensor unit 9. As shown in FIG. 4, the phase difference AF sensor unit 9 includes a visual field mask 101 arranged in the vicinity of an expected image formation plane on which a subject image is formed by the focus lens 3, a condenser lens 102, porous (two holes in FIG. 4) aperture masks 103A and 103B arranged behind them, secondary optical systems 104A and 104B including secondary image formation lenses, and a plurality of photoelectric conversion element arrays 105A and 105B arranged further behind the secondary optical systems 104A and 104B.

In the configuration shown in FIG. 4, the subject images constituted of the light fluxes passed through different pupil regions 106A and 106B of the focus lens 3 are formed on the different photoelectric conversion element arrays 105A and 105B again. Focus detection is performed by utilizing the fact that the relative positional relationship between these subject images changes in accordance with the in-focus state of the focus lens 3. The phase difference, which is the relative positional relationship between the subject images described above, can be acquired by obtaining the correlation between the subject images.

Figure 5:
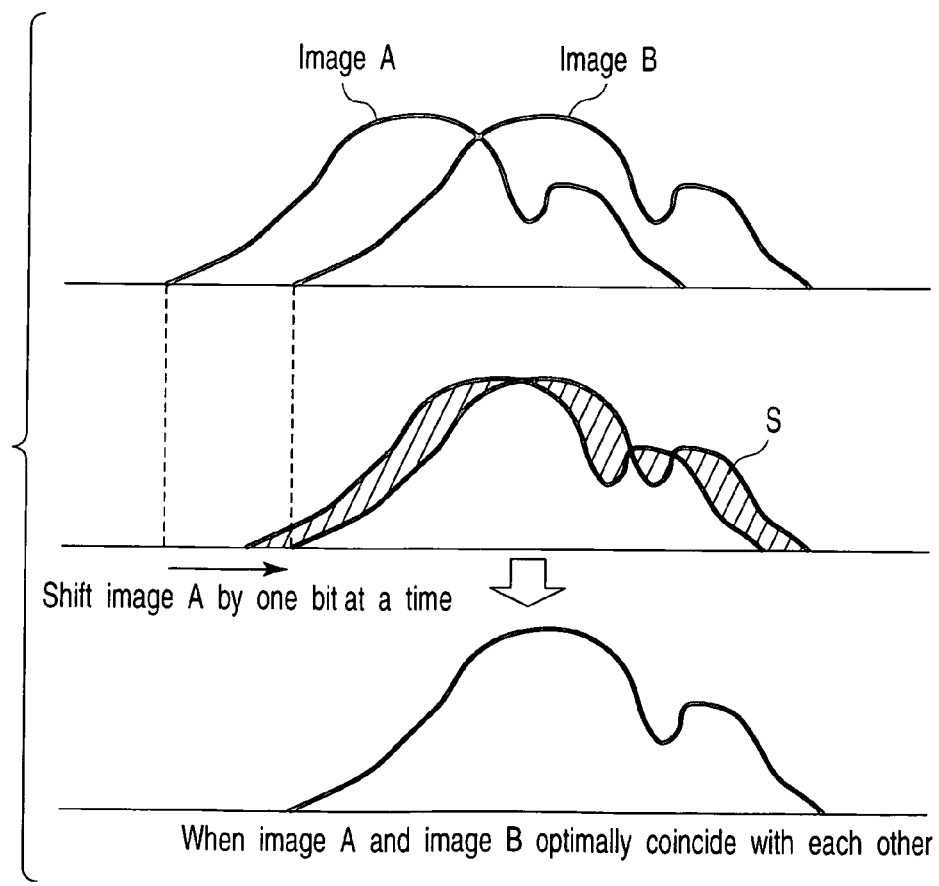
FIG. 5 is a view for explaining an outline of phase difference detection.

FIG. 5 is a view for explaining an outline of the phase difference detection. While shifting one (image A in the example of FIG. 5) of a pair of subject images (image A, image B) by one pixel (1 bit) of the photoelectric conversion element at a time, a shift amount that minimizes an area S (the sum total of absolute values of differences between corresponding pixels of the image A and the image B) of a region in which both the images do not overlap each other is obtained. That is, if the image A and the image B coincide with each other, the area S inevitably becomes the minimum value, and hence a shift amount that provides the minimum value becomes the phase difference, which is an amount of a relative deviation of the image A and the image B from each other.

In such a focus detection device utilizing the phase difference detection, an interval between the centers of gravity of the pupil regions forming a pair becomes a baseline length in the triangulation. Thus, it is possible to obtain a focus deviation amount of the focus lens 3 on the basis of the phase difference which is the relative amount of deviation on the photoelectric conversion element.

Figure 6:
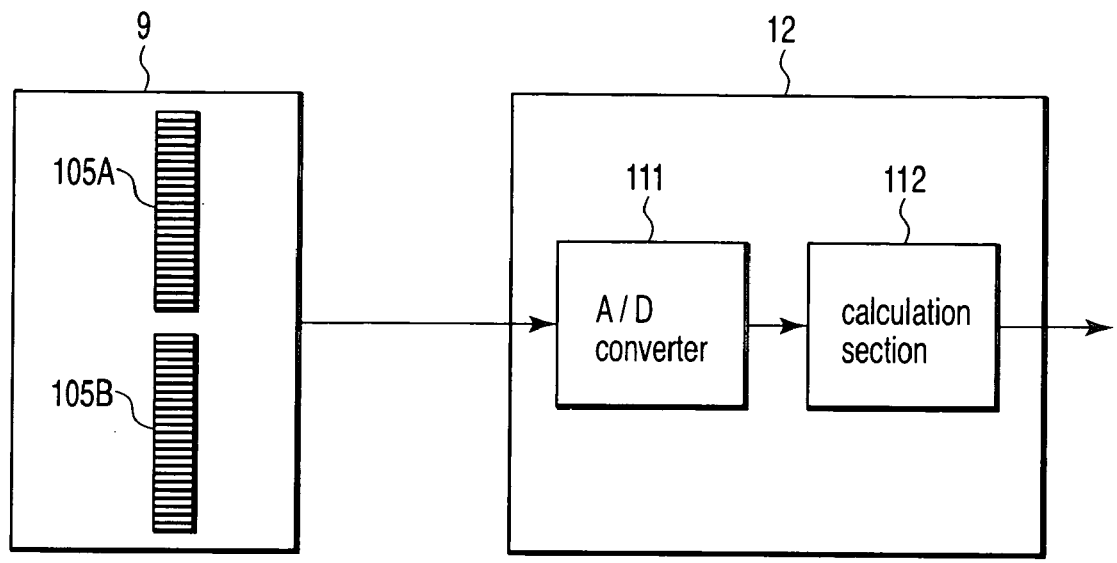
FIG. 6 is a configuration view showing a detail of a part of FIG. 1 associated with phase difference detection.

FIG. 6 is a configuration view showing the detail of a part of FIG. 1 associated with phase difference detection. In FIG. 6, the photoelectric conversion element arrays 105A and 105B are included in the phase difference AF sensor unit 9, and an A/D converter 111 and a calculation section 112 are included in the first focus detection section 12.

An analog output from each pixel in the photoelectric conversion element arrays 105A and 105B is converted into a digital signal by the A/D converter 111 of the first focus detection section 12. Further, the calculation section 112 is constituted of a microcomputer or the like. The calculation section 112 obtains a phase difference between images received by the photoelectric conversion element arrays 105A and 105B, and controls the focus lens 3 on the basis of the obtained phase difference.

Here, when it is assumed that output values of the photoelectric conversion element arrays 105A and 105B converted into digital values by the A/D converter 111 are L (1), L (2), . . . , L (n), R (1), R (2), . . . , R (n), and the relative deviation amount (phase difference) of the two images=i·p (p is the pixel pitch), a correlation function F (i) indicating the degree of coincidence of the images is given by, for example, the following equation (1).

$$F(i) = \sum_{j} |L(j) - R(j+1)| \quad (1)$$

If images on the photoelectric conversion element arrays 105A and 105B are relatively shifted from each other by k pixel pitches, then F (k)=0 is established. However, shapes of signals indicating the images from the photoelectric conversion element arrays 105A and 105B rarely coincide with each other due to pixel noise or the like, and hence F (k)>0 is normally established.

Figure 7:
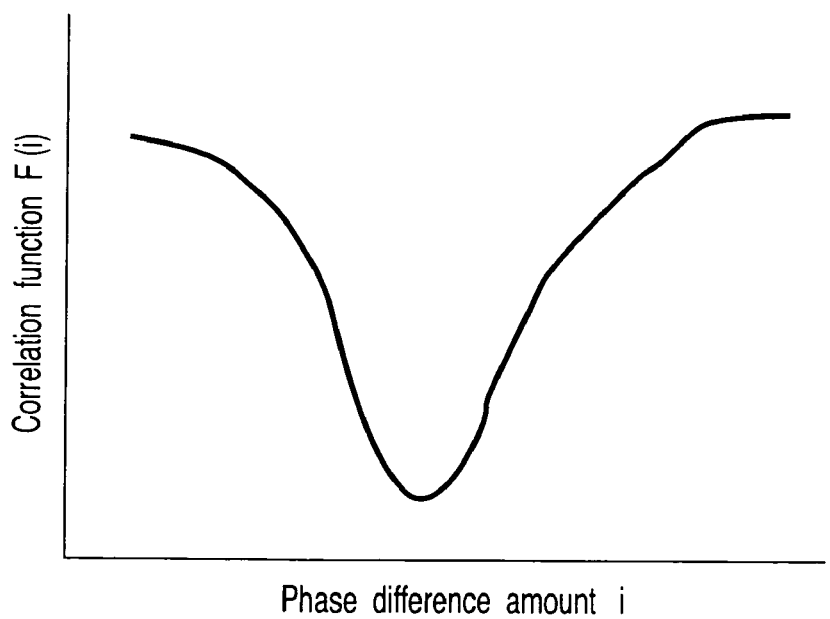
FIG. 7 is a view showing an example of a correlation function F (i)

FIG. 7 is a view showing an example of the relationship between i and F (i). Here, although (i, F (i)) is discrete data, it is shown as a continuous graph in FIG. 7 for the sake of convenience. After a minimum value of F (i) is obtained in a predetermined range of i, interpolation calculation using correlation function values in front and behind the minimum value is performed in order to perform highly accurate detection.

Above is a theoretical explanation of the TTL phase difference detection system. Such calculation processing is performed by the first focus detection section 12.

Next, focus adjustment based on the TTL phase difference detection will be described below. The relative deviation amount (phase difference) obtained by the above-mentioned interpolation calculation is converted into a focus deviation amount by the first focus detection section 12. This conversion is performed on the basis of a calculating formula based on an optical characteristic determined by the AF optical system (including the visual field mask 101, condenser lens 102, aperture masks 103A and 103B, and secondary optical systems 104A and 104B). After that, processing such as reliability judgment processing for judging whether or not the phase difference detection has been possible, judgment processing for judging whether or not the adjustment is within a range in which the adjustment can be regarded as being in focus, processing for selecting focus deviation amounts of a plurality of distance measurement points by a predetermined algorithm (for example, closest vicinity selection), and the like are performed. When the reliability of the detected phase difference is low in the reliability judgment, the phase difference detection is regarded as being impossible, and this fact is displayed by the display or the like in the finder using the LCD panel 10. Incidentally, when the reliability of the detected phase difference is low in the reliability judgment, phase difference detection may be performed again.

After the processing described above, when the result is out of focus, processing of moving the focus lens 3 is performed in order to obtain the in-focus state. In this case, a drive amount of the focus lens 3 is calculated by the first focus detection section 12 on the basis of the focus deviation amount and the optical characteristic of the interchangeable lens 2. The control section 16 transmits the calculated lens drive amount and the lens drive direction to the lens control section 5 in the interchangeable lens 2 as a phase difference AF lens drive command. Further, the lens control section 5 controls the lens drive section 4 on the basis of the received lens drive amount and the drive direction to drive the focus lens 3. Incidentally, the control section 16 may transmit a phase difference AF lens drive command including the focus deviation amount to the lens control section 5, and the lens control section 5 may calculate a drive amount and a drive direction of the focus lens 3.

Here, when the focus lens 3 cannot obtain an in-focus state at a position of the drive end (the infinite end or the closest vicinity end), and it is necessary to drive (further in the infinity direction at the infinite end, or further in the closest vicinity direction at the closest vicinity end) the focus lens 3 over the drive end of the focus lens 3 in order to obtain the in-focus state, the same out-of-focus display as the phase difference detection disabled time is performed by using the finder display, and the focus adjustment operation is terminated. Incidentally, a case may be caused where such a state occurs for a reason that a focus detection error is large. In such a case, the in-focus state may be forcibly set.

Given above is an outline of the focus adjustment based on the TTL phase difference detection. Next, the drive limit position of the focus lens associated with the operation of the focus lens at the drive end (infinite end, closest vicinity end) will be described below.

Figure 8A:
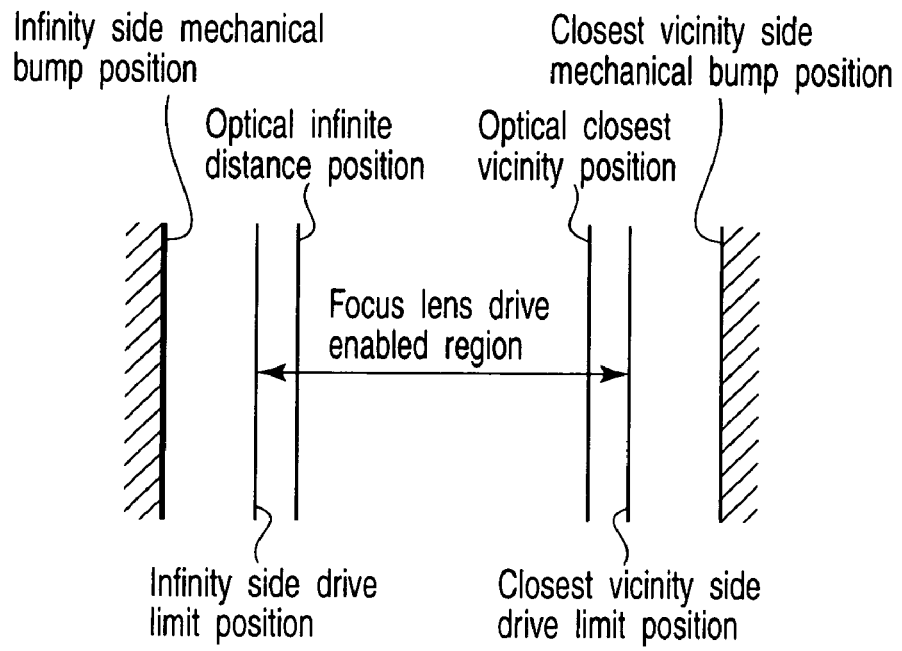
FIGS. 8A and 8B are views for explaining changes in an infinity side drive limit position and a closest vicinity side drive limit position in the first embodiment.

As shown in FIG. 8A, an infinity side mechanical bump position and a closest vicinity side mechanical bump position, which are structural limit positions associated with the focus lens drive, are designed with room with respect to the optical infinite distance position and the optical closest vicinity position. This is because the design is made with a margin for manufacture variation such as component variation and assembly variation, environmental change such as a change in temperature, a margin for variation due to other mechanical reasons, and a margin for control to be described later. Further, an infinity side drive limit position is set at position further having margin in the infinity side direction with respect to the optical infinite distance position. A closest vicinity side drive limit position is set at position further having margin in the closest vicinity side direction with respect to the optical closest vicinity position. Further, the drive range of the focus lens is set such that the range never fails to include the optical infinite distance position and the optical closest vicinity position. Such margins are set by taking into account the errors and change factors such as the mechanistic variation of the individual interchangeable lens, a change due to the temperature, and the like.

Further, in order to prevent the drive mechanism from mechanically colliding against the infinity side mechanical bump position and the closest vicinity side mechanical bump position, the infinity side drive limit position and the closest vicinity side drive limit position are set at positions having margins with respect to the infinity side mechanical bump position and the closest vicinity side mechanical bump position.

Next, a problem associated with the drive limit position caused when the hill-climbing AF is performed in an interchangeable lens for phase difference AF will be described below more specifically. In the hill-climbing AF, due to the technical limitations of the system, focus adjustment cannot be executed only after the focus lens 3 once passes the peak position ((P2, H2) in FIG. 3) of the AF evaluation value, which is the in-focus position. Accordingly, at the infinite distance position and the closest vicinity position, which are the drive ends of the focus lens 3, it is necessary to confirm that at least once an AF evaluation value is acquired after the focus lens 3 once passed the peak position (theoretically, the optical infinite distance position/optical closest vicinity position) of the AF evaluation value. However, in an interchangeable lens designed on the assumption that the phase difference AF system is employed, the above point is not taken into consideration. For this reason, the interval between the infinity side drive limit position and the optical infinite distance position is not always secured as an interval that can match the hill-climbing AF. Needless to say, the same applies to the interval between the closest vicinity side drive limit position and the optical closest vicinity position.

Figure 9:
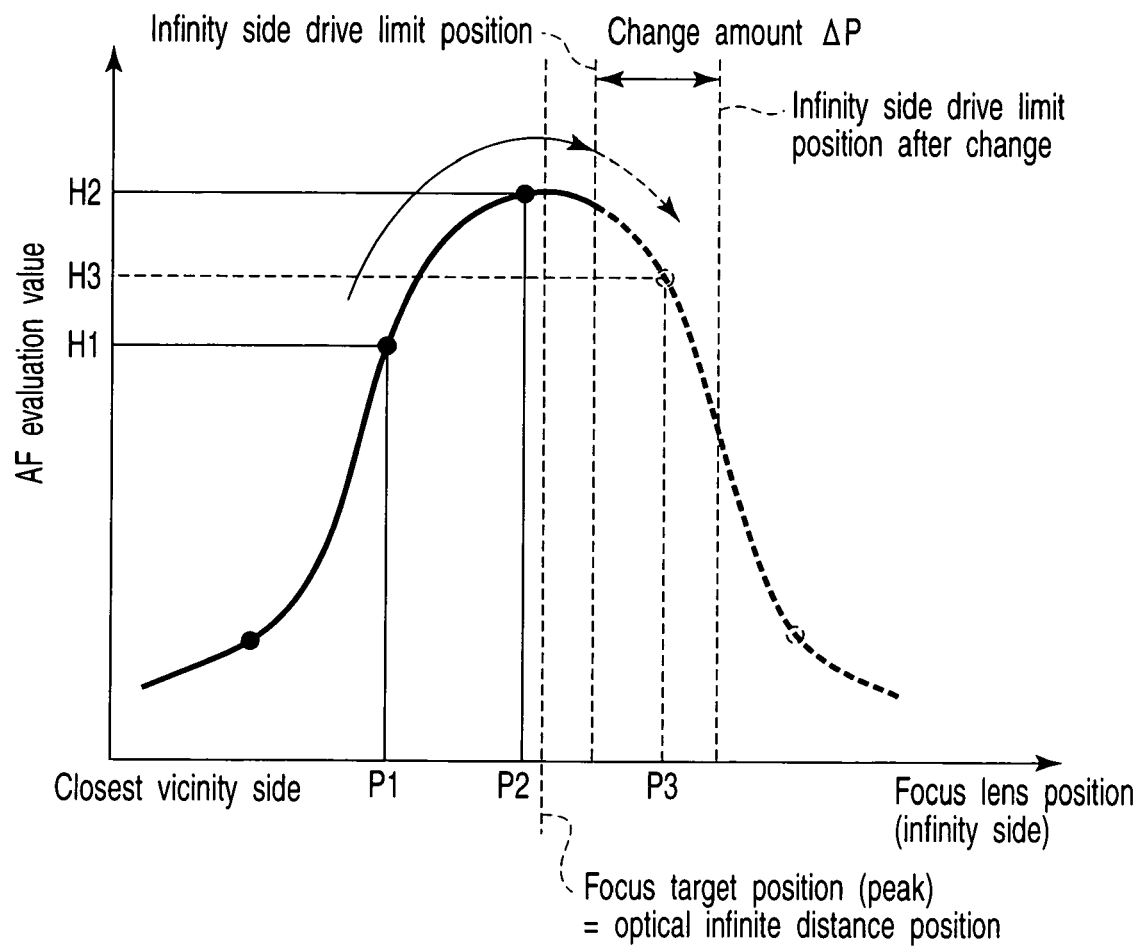
FIG. 9 is a view showing an example of an AF evaluation value history.

When the necessary interval described above is not secured, a problem is caused that it is not possible for a subject at the infinite distance position or at the closest vicinity position to be in focus. For example, as shown in FIG. 9, when a subject at the infinite distance position is in focus at the focus target position (=optical infinite distance position), it is necessary to acquire the AF evaluation value also at the focus lens position P3. However, only the drive to the infinity side limit position is permitted, and hence it is not possible to acquire the AF evaluation value at the focus lens position P3. In this case, the subject cannot be in focus.

An outline of a method for solving such a problem will be described below.

First, the infinity side drive limit position and the closest vicinity side drive limit position are stored in advance in the lens data memory 20 in the interchangeable lens 2 in the manufacturing step or the like. Further, when the focus adjustment is executed by the TTL phase difference AF, the lens control section 5 performs the drive control of the focus lens 3 on the basis of the infinity side drive limit position and the closest vicinity side drive limit position which are read by the lens control section 5 from the lens data memory 20.

Figure 8B:
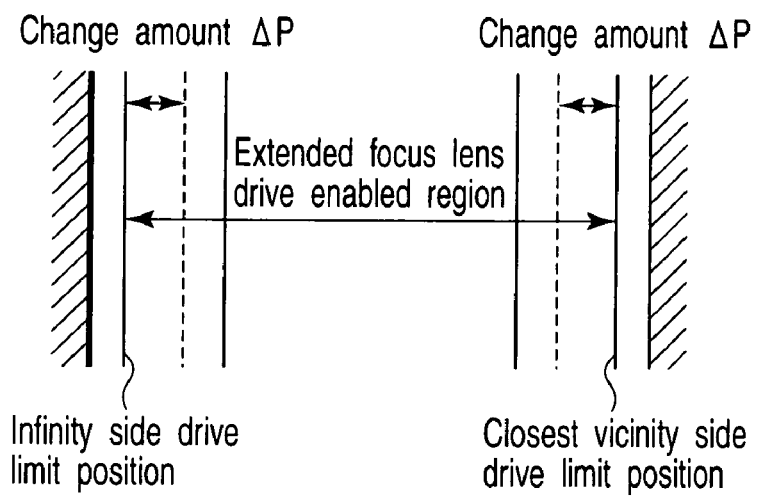

On the other hand, when the focus adjustment is executed by the hill-climbing AF, the infinity side drive limit position and the closest vicinity side drive limit position are used after they are changed to those for the hill-climbing AF. Specifically, as shown in FIG. 8B, the infinity side drive limit position is shifted toward the infinity side by a change amount ΔP, and the closest vicinity side drive limit position is shifted toward the closest vicinity side by a change amount ΔP. The change amount ΔP is an amount the optimum value of which varies depending on the lens type of the interchangeable lens, the optical characteristic thereof, the focus mechanism thereof, and the like. Accordingly, it is sufficient if the optimum value is obtained by a method for calculating the value for each interchangeable lens.

By extending the focus lens drive enabled region in the manner described above, even an interchangeable lens for the phase difference AF is enabled to perform the hill-climbing AF.

Figure 10:
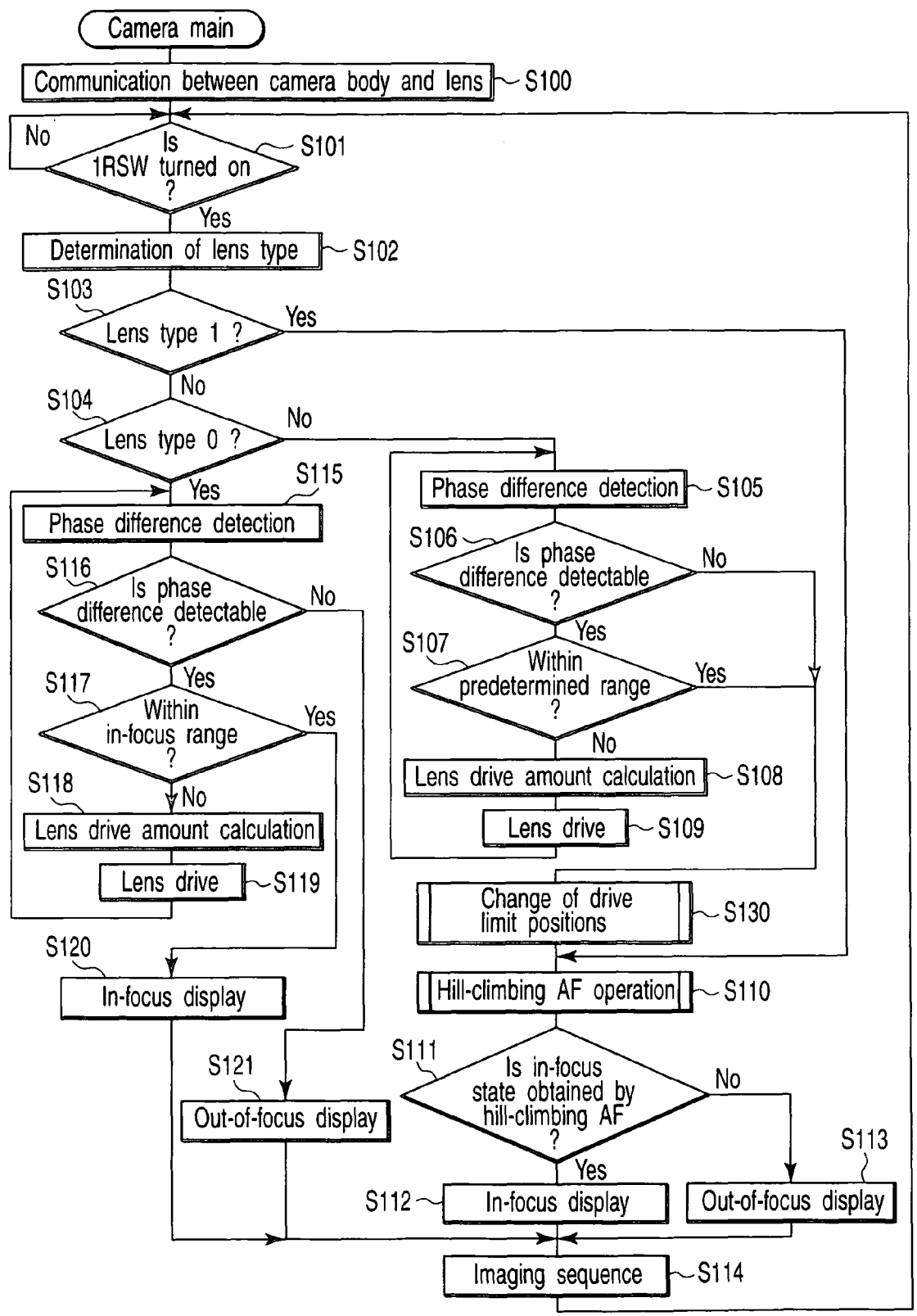
FIG. 10 is a flowchart showing a main operation of a control section of a camera body.

A detailed operation of the interchangeable lens type digital camera shown in FIG. 1 will be described below. FIG. 10 is a flowchart showing a main operation of the control section 16 shown in FIG. 1. In FIG. 10, when the power source (not shown) is turned on, communication is started between the control section 16 of the camera body 1 and the lens control section 5 of the interchangeable lens 2 in step S100. Further, various data stored in the interchangeable lens 2 are read, and stored in the memory included in the control section 16.

Figures 11, 12:
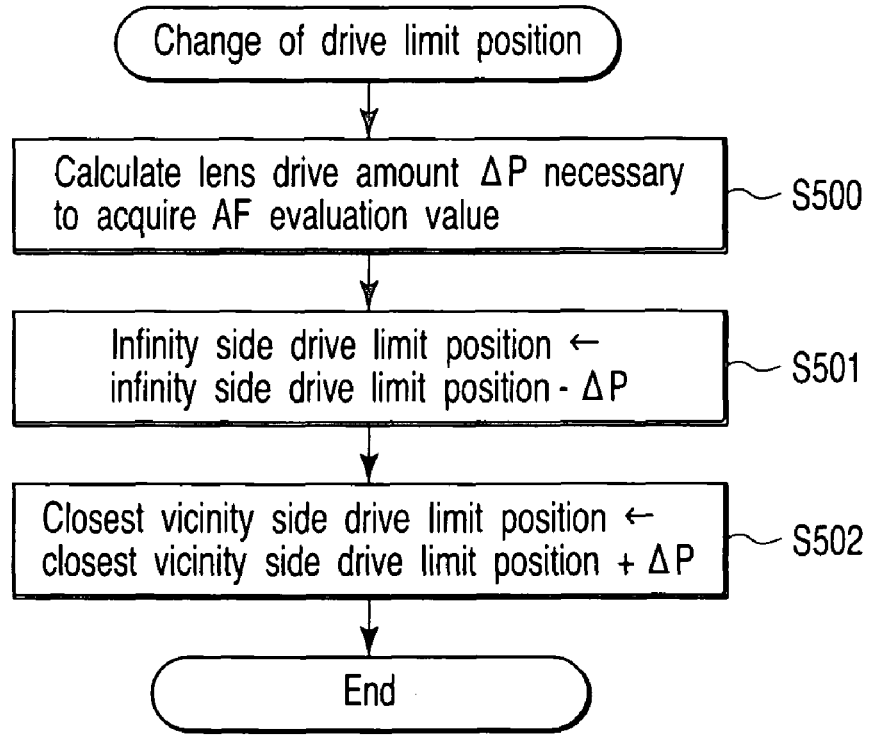
FIG. 11 is a view for explaining the lens type.
FIG. 12 is a flowchart showing drive limit position change processing.

First, the control section 16 judges, whether or not the first release switch (1RSW) of the release switch 18 is turned on in step S101. This judgment is performed until the first release switch (1RSW) is turned on, and an imaging preparation instruction is issued. When the release switch 18 is turned on in the judgment of step S101, the control section 16 determines the lens type of the interchangeable lens 2 in step S102. The lens type of the interchangeable lens 2 is determined by referring to the lens type data acquired by the lens communication in step S100. FIG. 11 is a view showing the lens type of the interchangeable lens 2. As shown in FIG. 11, a lens of the lens type 0 is an interchangeable lens compatible with only the phase difference AF. A lens of the lens type 1 is an interchangeable lens compatible with only the hill-climbing AF. A lens of the lens type 2 is an interchangeable lens compatible with both the phase difference AF and the hill-climbing AF. The correspondence between the lens type and the AF operation is as follows.

A lens of the lens type 0 is an interchangeable lens of a type that is quite unsuitable for the hill-climbing AF system. In other words, an interchangeable lens of the lens type 0 is not practically used to perform the hill-climbing AF, because when such lens is used to perform the hill-climbing AF, the AF operation time becomes very long. In the case of an interchangeable lens of the lens type 0, only the phase difference AF is performed.

A lens of the lens type 1 is an interchangeable lens of a type that is optimally designed for the hill-climbing AF system. In the case of an interchangeable lens of the lens type 1, only the hill-climbing AF is performed.

A lens of the lens type 2 is an interchangeable lens of a type that is optimally designed for the phase difference AF system, but it is an interchangeable lens of a type that can also be used for the hill-climbing AF. In an interchangeable lens of the lens type 2, coarse adjustment of the focus adjustment is performed by the phase difference AF and, thereafter, fine adjustment is performed by the hill-climbing AF.

In step S103, the control section 16 judges whether or not the interchangeable lens 2 is of the lens type 1. When the interchangeable lens 2 is of the lens type 1 in the judgment of step S103, the control section 16 performs the processing of step S110. As described above, the interchangeable lens 2 of the lens type 1 is optimized to be used for the hill-climbing AF. Accordingly, it is not necessary to perform the processing of "changing the drive limit position" of step S130, which will be described later. On the other hand, when the interchangeable lens 2 is of a lens type other than the lens type 1 in the judgment of step S103, the control section 16 performs the processing of step S104.

In step S104, the control section 16 judges whether or not the interchangeable lens 2 is of the lens type 0. When the interchangeable lens 2 is of the lens type 0 in the judgment of step S104, the control section 16 performs the processing of step S115. Further, when the interchangeable lens 2 is not of the lens type 0, i.e., when the interchangeable lens 2 is of the type 2, the control section 16 performs the processing of step S105.

In step S105, the control section 16 performs phase difference detection for the phase difference AF. That is, the control section 16 acquires an image signal from the phase difference AF sensor unit 9, and calculates a focus deviation amount by means of the first focus detection section 12. Further, the control section 16 performs a judgment on whether or not phase difference detection has been possible, a judgment as to whether or not the reliability of detection is high, and the like. After these judgments, the control section 16 stores the respective judgment results in the internal memory as flags or the like.

In step S106, the control section 16 judges whether or not a highly reliable focus deviation amount has been obtained in the phase difference detection, i.e., whether or not a phase difference has been detected by referring to a flag and the like. When the phase difference has been detected in the judgment of step S106, the control section 16 performs the processing of step S107. On the other hand, when the phase difference has not been detected in the judgment of step S106, the control section 16 performs the processing of step S130.

In step S107, the control section 16 judges whether or not the detected focus deviation amount is within a predetermined range by referring to a flag and the like. Here, the predetermined range in step S107 is a numerical value determined in advance as a value that enables a focusing operation to be performed by the hill-climbing AF with sufficiently high accuracy and at a sufficiently high speed as long as the focus deviation amount is within the range of this value.

When the focus deviation amount is not within the predetermined range in the judgment of step S107, the control section 16 performs the processing of step S108. On the other hand, when the focus deviation amount is within the predetermined range in the judgment of step S107, the control section 16 performs the processing of step S130.

In step S108, the control section 16 calculates a drive amount of the focus lens 3 for bringing the focus lens 3 into the in-focus state from the obtained focus deviation amount. Further, the control section 16 performs lens drive in step S109. That is, the control section 16 transmits the lens drive amount and the drive direction calculated in step S108 to the lens control section 5 in the interchangeable lens 2 as a phase difference AF lens drive command. Upon receipt of this command, the lens control section 5 controls the lens drive section 4 to drive the focus lens 3.

In step S130, the control section 16 changes the infinite and closest vicinity drive limit positions. As described previously, the control section 16 acquires the data of the infinity and closest vicinity side drive limit positions stored in advance in the lens data memory 20 in the interchangeable lens 2 necessary for the hill-climbing AF by communicating with the lens control section 5. Further, on the basis of the data, the control section 16 sets infinity and closest vicinity side drive limit positions suitable for the hill-climbing AF.

The subroutine of step S130, i.e., "change of drive limit positions" will be described below with reference to the flowchart of FIG. 12. Incidentally, regarding the changing of the drive limit positions, the change amount is appropriately set in accordance with the lens type and the characteristic of the interchangeable lens.

In the hill-climbing AF, interpolation processing is performed on the basis of AF evaluation values of three point positions of the focus lens 3 at each of which a change in the AF evaluation value of a predetermined amount occurs, thereby obtaining a true peak position of the AF evaluation value. At this time, the positions of the focus lens 3 at each of which a change in the AF evaluation value of a predetermined amount can be obtained differ depending on the characteristic of the interchangeable lens 2. Further, normally, position control of the focus lens 3 is performed on the basis of the number of pulses of a focus encoder or the number of steps of a stepping motor for driving. In this position control, an image movement amount of an image per pulse (step) differs in accordance with the optical conditions such as a focal distance of the interchangeable lens 2. Thus, in step S500, the control section 16 calculates a focus lens drive amount ΔP necessary to acquire an effective AF evaluation value corresponding to the characteristic of the interchangeable lens by using the data stored in the lens data memory 20 in the interchangeable lens 2 such as the focal distance, the image movement amount per unit drive pulse, and the like as parameters. The reference position of the focus lens is set at the infinity side mechanical bump position (see FIG. 8A), and a direction from this position to the closest vicinity side is defined as the normal direction.

In step S501, the control section 16 subtracts ΔP from the current infinity side drive limit position to change the infinity side drive limit position. Further, in step S502, the control section 16 adds ΔP to the current closest vicinity side drive limit position to change the closest vicinity side drive limit position. After the above operation, the subroutine "change of drive limit positions" is terminated.

The description now returns to the description of FIG. 10. In step S110, the control section 16 performs the hill-climbing AF. Incidentally, the processing of the hill-climbing AF will be described later.

In step S111, the control section 16 judges whether or not an in-focus state is obtained as a result of the hill-climbing AF operation by referring to a flag and the like. Further, when the in-focus state is obtained in the judgment of step S111, the control section 16 displays an in-focus display indicating that the in-focus state is obtained on the LCD panel 10 in step S112. On the other hand, when the in-focus state is not obtained in the judgment of step S111, the control section 16 displays a display indicating an out-of-focus state on the LCD panel 10 in step S113.

After executing the processing in step S112 or S113, the control section 16 executes an imaging sequence in step S114. This imaging sequence is executed when the release button is pressed all the way down, the second release switch (2RSW) of the release switch 18 is turned on, and an instruction to perform the imaging operation is issued. When the imaging sequence is started, exposure of the image pickup device 7 is started. Further, after subjecting an image signal obtained by the exposure to image processing, the control section 16 stores the processed image in an internal nonvolatile memory or the like. After the imaging sequence is terminated, the flow is returned to step S101, and turning on of the first release switch (1RSW) is waited.

Further, when the interchangeable lens 2 is of the lens type 0 in the judgment of step S104, the control section 16 executes phase difference detection in step S115. That is, the control section 16 acquires an image signal from the phase difference AF sensor unit 9, and calculates a focus deviation amount by means of the first focus detection section 12. Further, the control section 16 performs judgment for judging whether or not the phase difference detection has been possible, judgment for judging whether or not the reliability of the detection is high, and the like. After performing these judgments, the control section 16 stores the judgment results in the internal memory as flags or the like.

In step S116, the control section 16 judges in step S116 whether or not a highly reliable focus deviation amount has been obtained in the phase difference detection, i.e., whether or not a phase difference has been detected by referring to a flag or the like. When the phase difference has been detected in the judgment of step S116, the control section 16 performs the processing of step S117. On the other hand, when the phase difference has not been detected in the judgment of step S116, the control section performs the processing of step S121. That is, the control section displays a display indicating the out-of-focus state on the LCD panel 10 in step S121.

In step S117, the control section 16 judges whether or not the detected focus deviation amount is within a predetermined range by referring to a flag or the like. Here, the predetermined range in step S117 is a numerical value determined in advance as a value that allows an in-focus state to be regarded as being obtained as long as the detected focus deviation amount is within the range of this value. When the focus deviation amount is not within the predetermined range in the judgment of step S117, the control section 16 performs the processing of step S118. On the other hand, when the focus deviation amount is within the predetermined range in the judgment of step S117, the control section 16 performs the processing of step S120. That is, the control section 16 displays an in-focus display indicating that the in-focus state has been obtained on the LCD panel 10.

In step S118, the control section 16 calculates a drive amount of the focus lens 3 for bringing the focus lens into the in-focus state from the obtained focus deviation amount. In step S119, the control section 16 causes the lens drive to be performed. That is, the control section 16 transmits the lens drive amount and the drive direction calculated in step S118 to the lens control section 5 in the interchangeable lens 2 as a phase difference AF lens drive command. Upon receipt of this command, the lens control section 5 controls the lens drive section 4 to drive the focus lens 3.

After executing the processing of step S120 or S121, the control section 16 executes an imaging sequence in step S114.

As described above, in the case of the lens type 0, only the phase difference AF is performed, in the case of the lens type 1, only the hill-climbing AF is performed, and in the case of the lens type 2, the coarse adjustment of the focus adjustment is first performed by the phase difference AF and, thereafter the fine adjustment of the focus adjustment is performed by the hill-climbing AF.

Figure 13:
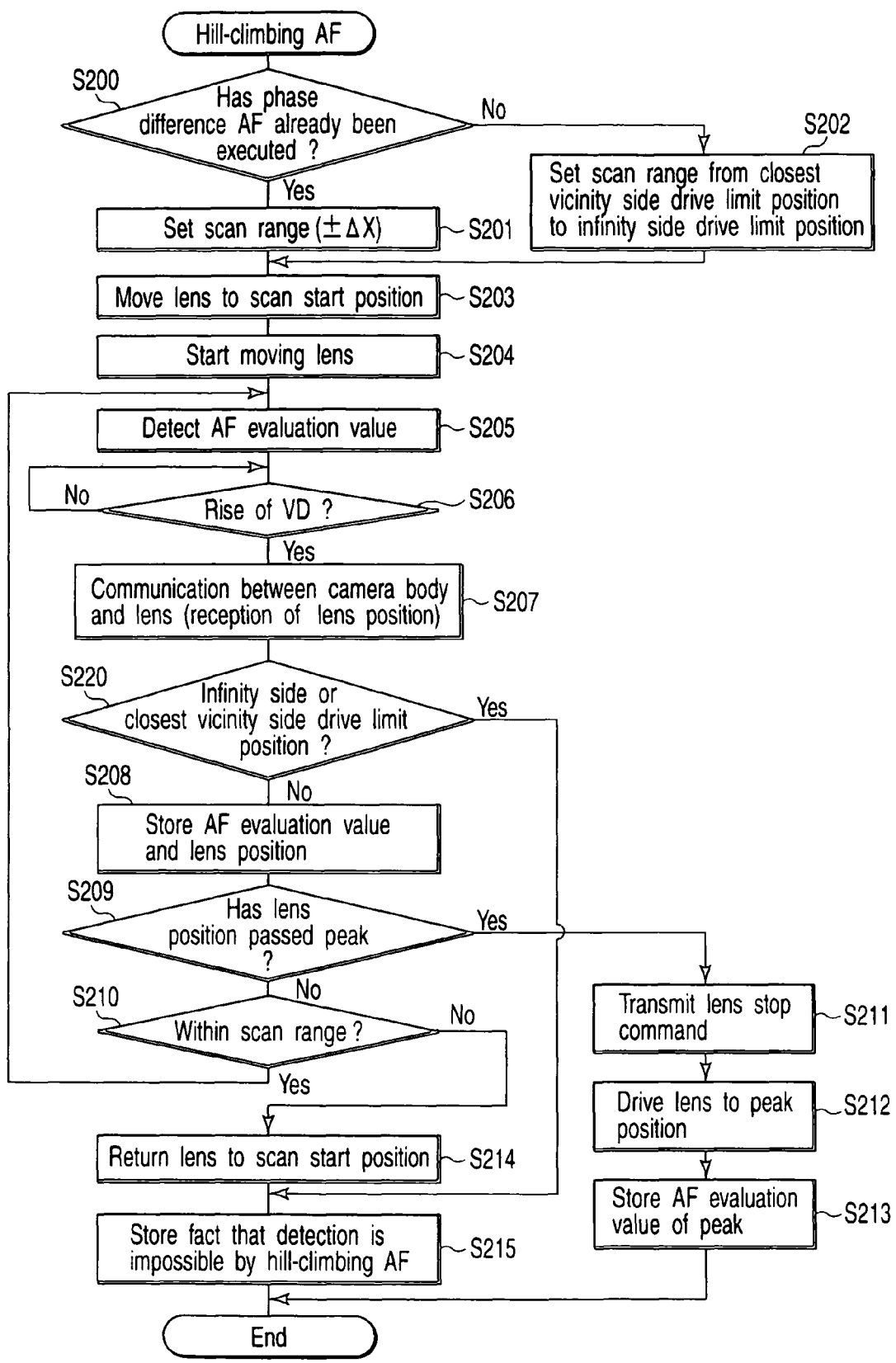
FIG. 13 is a flowchart showing details of a focusing detection operation performed by a hill-climbing AF operation.

FIG. 13 is a flowchart showing details of a focusing detection operation performed by a hill-climbing AF operation. In step S200, the control section 16 judges whether or not the phase difference AF has already been executed. When the phase difference AF has already been executed in the judgment of step S200, the control section 16 performs the processing of step S201. On the other hand, when the phase difference AF has not been executed in the judgment of step S200, the control section 16 performs the processing of step S202.

In step S201, the control section 16 sets a scan range of the hill-climbing AF. The scan range in this case is set in such a manner that the current position of the focus lens 3 is set as a central position of the scan range, and the scan range includes ΔXs in front and behind the central position. Incidentally, ΔX is a scan range determined in advance as a range that enables a focusing operation to be performed by the hill-climbing AF with sufficiently high accuracy and at a sufficiently high speed. This ΔX is stored in the lens data memory 20 in the interchangeable lens 2, and is read and used by the control section 16. Further, ΔX is a numerical value which is appropriately changed by the parameters such as the focal distance of the interchangeable lens 2, the position (distance) of the focus lens 3, the level of the reliability of the phase difference detection, and the like. In step S202, the control section 16 sets the scan range in the entirety of the region in which the focus lens 3 can be moved, i.e., the control section 16 sets the scan range from the closest vicinity side drive limit position to the infinity side drive limit position. This is because there is a strong possibility that the phase difference AF is not executed beforehand, and the focus lens 3 is not positioned near the in-focus position. Incidentally, the scan range set in step S201 or S202 is transmitted to the lens control section 5, and the actual operation judgment of the scan range is performed by the lens control section 5.

In step S203, the control section 16 transmits a predetermined command to the lens control section 5. Upon receipt of the command, the lens control section 5 controls the lens drive section 4 to move the focus lens 3 from the current focus lens position toward a scan range end closer to the current focus lens position.

In step S204, the control section 16 transmits a hill-climbing AF lens drive command to the lens control section 5 to cause the lens control section 5 to start a scan operation of the focus lens 3. In step S205, the control section 16 acquires an AF evaluation value for the hill-climbing AF obtained by the image processing section 13 at a predetermined timing synchronized with the vertical synchronizing signal VD from the image processing section 13.

In step S206, the control section 16 judges whether or not a next rise of the vertical synchronizing signal VD from the image processing section 13 has been received. When the rise of the vertical synchronizing signal VD has been received in the judgment of step S206, the control section 16 acquires position data of the focus lens 3 from the lens control section 5.

In step S220, the control section 16 judges whether or not the focus lens 3 has reached the infinity side drive limit position or the closest vicinity side drive limit position by referring to a flag or data from the lens control section 5. When the focus lens 3 has reached the infinity side drive limit position or the closest vicinity side drive limit position in the judgment of step S220, the control section 16 stops the hill-climbing AF, and performs the processing of step S215. On the other hand, when the focus lens 3 has not reached the infinity side drive limit position or the closest vicinity side drive limit position in the judgment of step S220, the control section 16 performs the processing of step S208.

In step S208, the control section 16 stores the AF evaluation value acquired in step S205 and the position data of the focus lens 3 acquired in step S207 in the internal memory as the AF evaluation value history. An example of the AF evaluation value history described above is as shown in FIG. 9. At this time, as described previously, it becomes normally not possible to obtain an AF evaluation value at the drive end of the focus lens 3. However, as shown in FIG. 9, it becomes possible to detect a peak of the AF evaluation value at the infinite end by performing the hill-climbing AF in accordance with the infinity side drive limit position changed in consideration of the change amount ΔP. Incidentally, the intervals (P2−P1), (P3−P2) between the positions P1, P2, and P3 of the focus lens 3 shown in FIG. 9 are set such that they are equal to the focus lens drive amount ΔP necessary to acquire an effective AF evaluation value.

In step S209, the control section 16 refers to the AF evaluation value history to judge whether or not the focus lens 3 has passed the in-focus point (the peak value of the AF evaluation value) position. When the focus lens 3 has already passed the in-focus point position in the judgment of step S209, the control section 16 performs the processing of step S211. On the other hand, when the focus lens 3 has not passed the in-focus point position in the judgment of step S209, the control section 16 performs the processing of step S210.

In step S210, the control section 16 judges whether or not the position of the focus lens 3 is within the range set in step S201 or S202. When a region to be scanned is left undone in the judgment of step S210, the control section 16 performs the processing of step S205. On the other hand, when there is no remaining region to be scanned in the judgment of step S210, the control section 16 performs the processing of step S214. In the loop from step S205 to S210, the focus lens 3 continues to be moved. At this time, a search for the peak position of the focus lens 3 in the hill-climbing AF is performed by repeating the above processing.

When the focus lens 3 has already passed the in-focus point position in the judgment of step S209, the control section 16 transmits a lens stop command to the lens control section 5 to cause the lens control section 5 to stop the focus lens 3. In step S212, the control section 16 obtains the position of the focus lens 3 corresponding to the peak position in detail from the AF evaluation value history by interpolation processing. Further, the control section 16 transmits data of the position of the focus lens 3 corresponding to the peak position to the lens control section 5. The lens control section 5 causes the lens drive section 4 to move the focus lens 3 to the position of the data transmitted from the control section 16. In the interpolation processing of obtaining the peak position, the peak position is obtained by performing, for example, calculation processing by linear interpolation based on the information on the three points (P1, H1), (P2, H2), and (P3, H3) in the AF evaluation history. In step S213, the control section 16 stores the AF evaluation value of the peak position obtained as a result of the hill-climbing AF in the memory to terminate the processing, and thereafter returns to the main routine.

On the other hand, when the processing in the scan range is terminated in the judgment of step S210, the control section 16 moves the focus lens 3 to the scan start position. Thereafter, in step S215, the control section 16 stores the fact that detection has been impossible by the hill-climbing AF in the memory as a flag or the like to terminate the processing, and then returns to the main routine.

Figure 14:
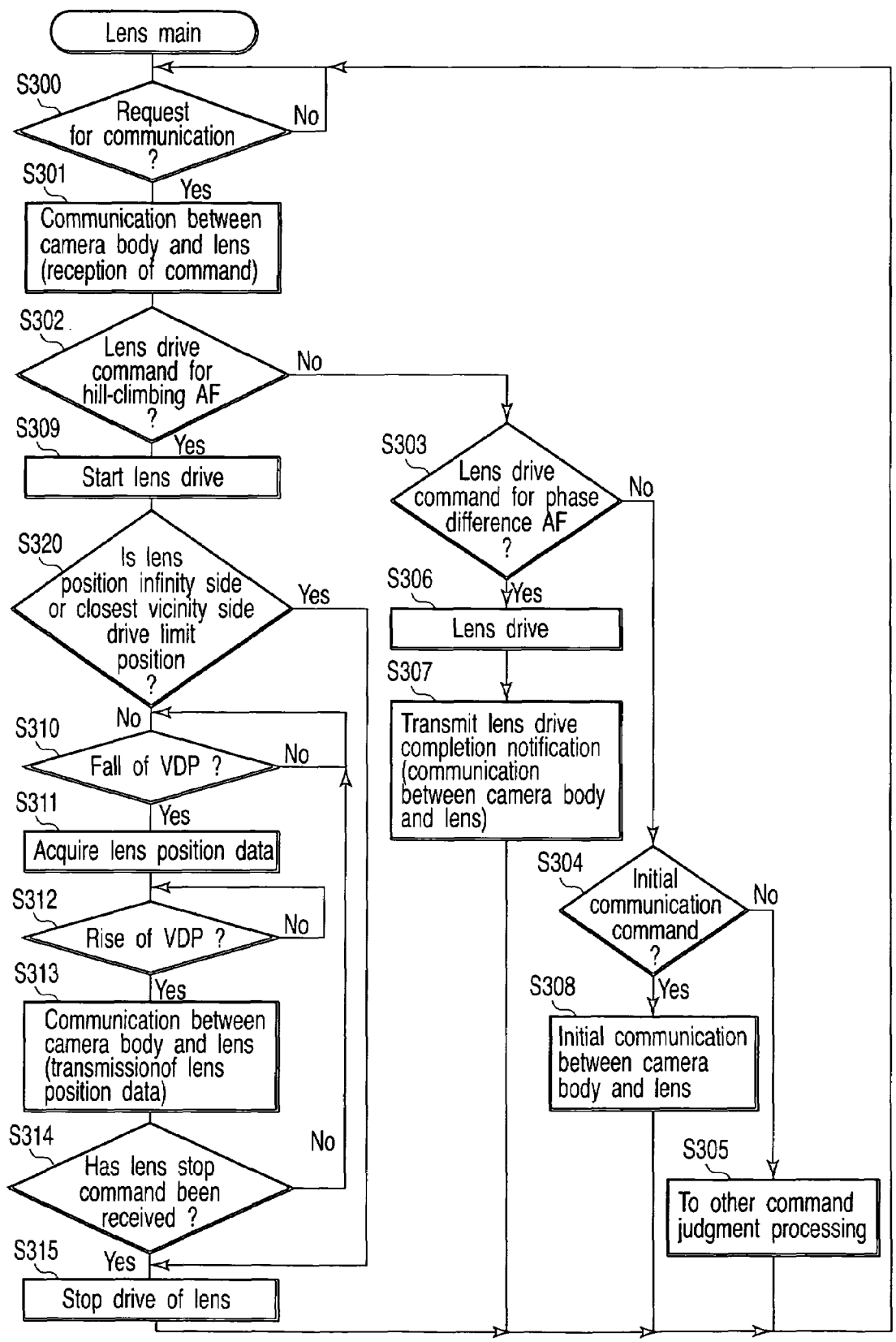
FIG. 14 is a flowchart showing an operation of a lens control section.

Next, the operation of the interchangeable lens 2 will be described below with reference to the operation flowchart of the lens control section 5 of FIG. 14. In FIG. 14, when the power source of the camera body 1 (not shown) is turned on, power is supplied from the camera body 1 side to the interchangeable lens 2 through the lens contact point sections 8. The interchangeable lens 2 is supplied with the power for the lens, and hence each part in the interchangeable lens 2 is initialized, whereby the lens control section 5 becomes operable. Further, the lens control section waits for a request for communication from the control section 16 in step S300.

When a request for communication is received from the control section 16 in step S300, the lens control section 5 performs the processing of step S301. In step S301, the lens control section 5 receives a command from the control section 16.

In step S302, the lens control section 5 judges whether or not the command received from the control section 16 is a lens drive command for the hill-climbing AF. When the received command is not a lens drive command for the hill-climbing AF in the judgment of step S302, the lens control section 5 judges in step S303 whether or not the received command is a lens drive command for the phase difference AF. When the received command is not a lens drive command for the phase difference AF in the judgment of step S303, the lens control section 5 judges in step S304 whether or not the received command is an initial communication command. Further, when the received command is not an initial communication command in the judgment of step S304, the lens control section 5 regards the received command as a command other than the above-mentioned commands, and performs corresponding processing in step S305. A description of details of this processing is omitted.

At the beginning, after turning on the lens power source, an initial communication command is transmitted from the control section 16 to the lens control section 5. In this case, the lens control section 5 performs an initial communication with the control section 16 in step S308. In this initial communication, initial setting in the interchangeable lens 2 is performed, and various data stored in the interchangeable lens 2 are transmitted to the control section 16. The various data in the interchangeable lens 2 include information such as a lens type, a focal distance, an imaging-enabled distance, focus lens limit positions, a motor type, and the like, and various correction values associated with AF and the like. After termination of the initial communication of step S308, the flow is returned to step S300, and a request for communication from the control section is waited for.

Further, when the received command is a lens drive command for the phase difference AF in the judgment of step S303, the lens control section 5 drives the focus lens 3 on the basis of the lens drive amount and the drive direction included in the phase difference AF lens drive command in step S306. Further, when the lens drive is completed, the lens control section 5 transmits a lens drive completion notification to the control section 16 of the camera body 1 in step S307. Thereafter, the lens control section 5 returns to step S300, and waits for a request for communication from the control section 16.

Further, when the received command is a lens drive command for the hill-climbing AF in the judgment of step S302, the lens control section 5 starts the lens drive for the hill-climbing AF in and subsequent to step S309. In step S320, the lens control section 5 judges whether or not the focus lens 3 has reached the infinity side drive limit position or the closest vicinity side drive limit position by referring to the output data of the encoder 15. When the focus lens 3 has reached the infinity side drive limit position or the closest vicinity side drive limit position in the judgment of step S320, the lens control section 5 immediately stops the drive of the focus lens 3 in step S315 in order to avoid mechanical bump of the drive mechanism of the focus lens 3. Further, the lens control section 5 stores the fact the focus lens 3 has reached the infinity side drive limit position or the closest vicinity side drive limit position by processing such as setting a predetermined flag and the like. The lens control section 5 transmits, at the time of communication with the camera body 1, the flag data to the control section 16.

On the other hand, when the focus lens 3 has not reached the infinity side drive limit position or the closest vicinity side drive limit position in the judgment of step S320, the lens control section 5 judges in step S310 whether or not a fall of a signal VDP synchronized with the vertical synchronizing signal VD has appeared. Thereafter, the lens control section 5 waits for the fall of the signal VDP to come. When the fall of the signal VDP is detected in the judgment of step S310, the lens control section 5 acquires in step S311 output data of the encoder 15 indicating the position of the focus lens 3. In subsequent step S312, the lens control section 5 judges whether or not a rise of the signal VDP has come. Thereafter, the lens control section 5 waits for the rise of the signal VDP to come. When the rise of the signal VDP is detected in the judgment of step S312, the lens control section 5 transmits in step S313 the position data of the focus lens 3 acquired from the encoder 15 to the control section 16. In subsequent step S314, the lens control section 5 judges whether or not a lens stop command has been received. When the lens stop command has been received, the lens control section 5 stops the drive of the focus lens 3 in step S315.

On the other hand, when the lens stop command has not been received in the judgment of step S314, the lens control section 5 returns to step S310, and waits for the fall of the signal VDP. Thereafter, the operation of steps S310 to S314 is repeated until the lens stop command is received.

Figure 15:
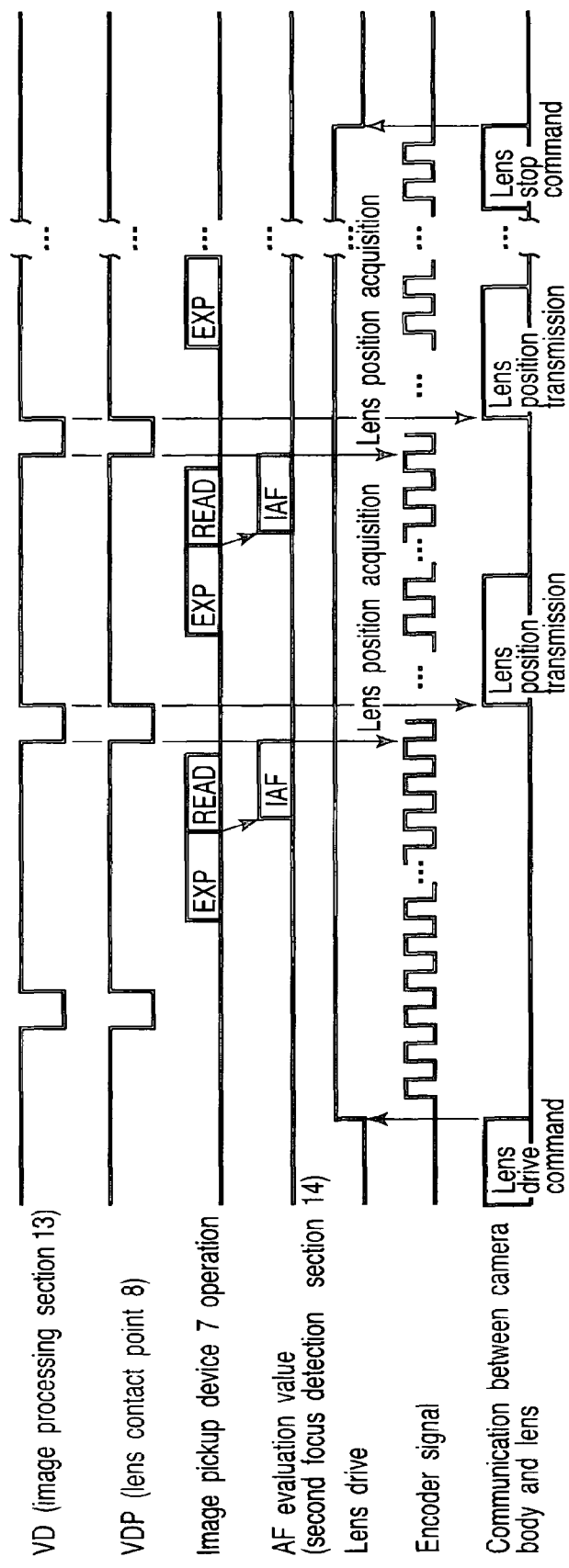
FIG. 15 is a timing chart at the time of a hill-climbing AF operation.

A timing chart showing such a hill-climbing AF operation is shown in FIG. 15. The hill-climbing AF will be further described below with reference to this timing chart.

When the hill-climbing AF processing is started by the control section 16 of the camera body 1, a lens drive command is transmitted from the control section 16 to the lens control section 5. Upon receipt of this command, the lens control section 5 starts lens drive. That is, the lens control section 5 causes the lens drive section 4 to drive the focus lens 3. At this time, the encoder 15 generates a pulse signal accompanying the movement of the focus lens 3, and outputs the pulse signal to the lens control section 5. By counting the pulse signal, the lens control section 5 acquires the position data of the focus lens 3.

In the camera body 1, the image pickup device 7 is operated in time to a predetermined timing corresponding to the vertical synchronizing signal VD generated by the image processing section 13. After the image pickup device 7 is performed an exposure (EXP), the image processing section 13 performs reading (READ) of an output signal from the image pickup device 7. Further, the second focus detection section 14 performs detection (IAF) of an AF evaluation value in synchronization with the reading (READ) of the output signal of the image pickup device 7 performed by the image processing section 13. Incidentally, a completion timing of calculation of the AF evaluation value is set in advance such that the calculation is completed before the rise of the vertical synchronizing signal VD.

During the AF evaluation value detection operation in the camera body 1, the lens control section 5 waits for the fall of the signal VDP synchronized with the vertical synchronizing signal VD generated by the image processing section 13. When the fall of the signal VDP is input, the lens control section 5 acquires position data of the focus lens 3 from the number of pulses of the pulse signal from the encoder 15 that has been counted up at that moment. Thereafter, the lens control section 5 waits for the rise of the signal VDP. When the rise of the signal VDP is input, the lens control section 5 transmits the acquired position data of the focus lens 5 to the control section 16.

After the detection of the AF evaluation value, the control section 16 waits for the rise of the vertical synchronizing signal VD. When the rise of the vertical synchronizing signal VD is input, the control section 16 receives the position data of the focus lens 3 transmitted from the lens control section 5. In this manner, the control section 16 can acquire the position data of the focus lens 3 in synchronization with the rise of the vertical synchronizing signal VD.

The operation described above is repeatedly executed during the drive of the focus lens 3 at the time of the hill-climbing AF operation. Further, when a lens stop command is transmitted from the control section 16 to the lens control section 5, the lens control section 5 stops the drive of the focus lens 3.

As described above, in this embodiment, when the hill-climbing AF is performed by using the interchangeable lens (of the lens type 2 in this embodiment), which is of the type optimally designed for the phase difference AF system and can also be used for the hill-climbing AF, the infinity side drive limit position and the closest vicinity side drive limit position stored in the interchangeable lens 2 are further shifted to the extension side as compared with the normal case. Accordingly, in all the interchangeable lenses including the phase difference AF interchangeable lens, highly accurate focus adjustment by the hill-climbing AF is enabled at the infinite distance position or the closest vicinity position. Incidentally, in this embodiment, a camera body 1 equipped with both the configurations of the phase difference AF system and the hill-climbing AF system is shown as an example. However, the configuration for the phase difference AF system is not indispensable, and this embodiment is also applicable to a camera body 1 equipped with only the hill-climbing AF system.

Second Embodiment

Next, a second embodiment of the present invention will be described below. In the first embodiment, regarding the infinity side drive limit position, $\Delta P$ is subtracted from the infinity side drive limit position stored in the lens data memory 20 in the interchangeable lens 2, and the obtained position is set as the new infinity side drive limit position. Further, regarding the closest vicinity side drive limit position, $\Delta P$ is added to the closest vicinity side drive limit position stored in the lens data memory 20, and the obtained position is set as the new closest vicinity side drive limit position. When the infinity side drive limit position or the closest vicinity side drive limit position is changed to a position shifted toward the infinity side mechanical bump position or the closest vicinity side mechanical bump position by the amount of $\Delta P$, there is the possibility of the infinity side drive limit position or the closest vicinity side drive limit position after being shifted by the amount of $\Delta P$ overlapping the infinity side mechanical bump position or the closest vicinity side mechanical bump position. In this case, the focus lens 3 bumps against the infinity side (or closest vicinity side) mechanical bump position. Further, in this case, the position of the focus lens 3 is restricted. Thus, there is the possibility of the accuracy of the hill-climbing AF being lowered or the possibility of the mechanical structure being damaged by the mechanical bump of the focus lens 3.

Figure 16:
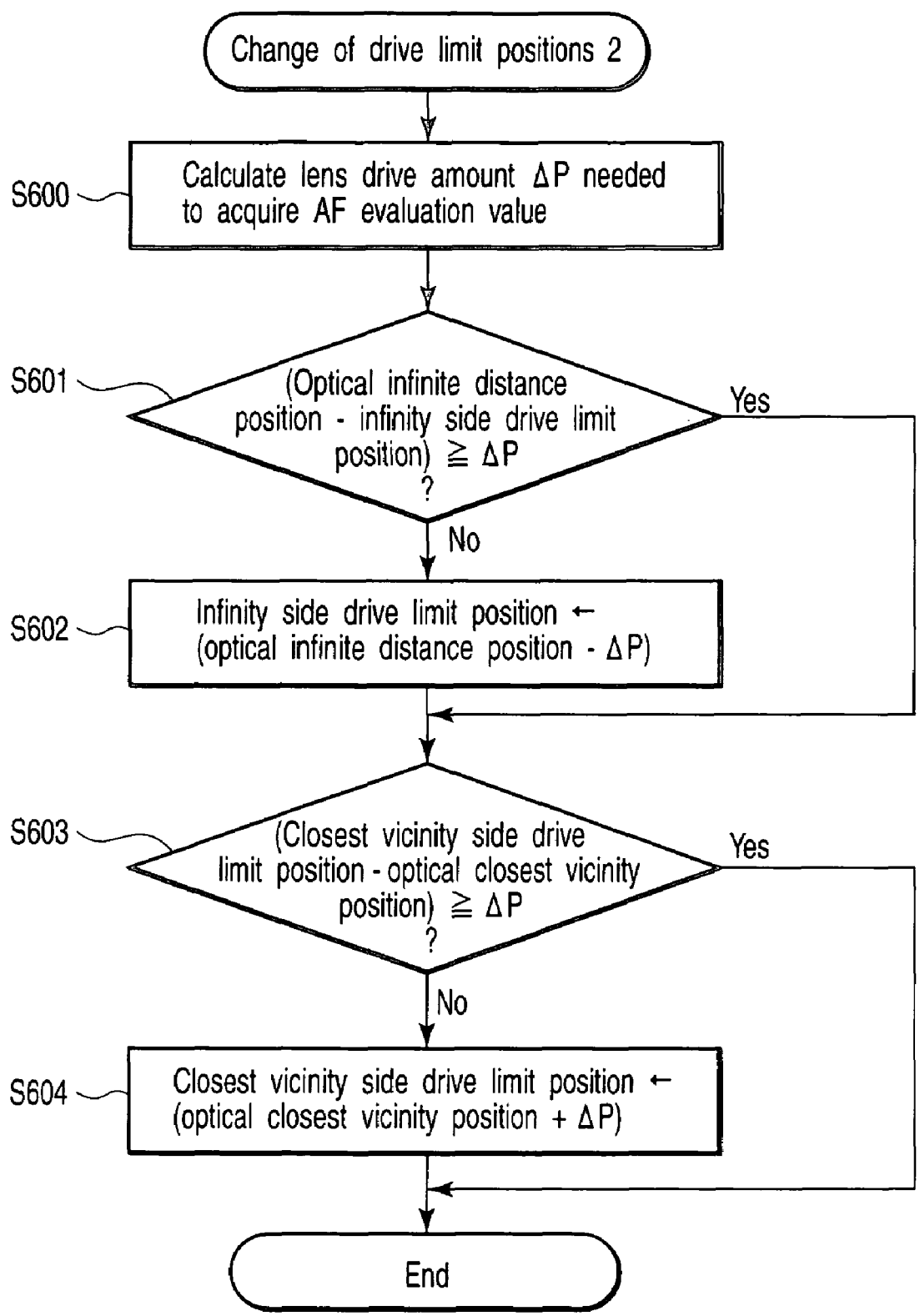
FIG. 16 is a flowchart of the drive limit position change 2 in a second embodiment of the present invention.

Thus, in the second embodiment, countermeasures against the above problem are taken by performing the processing according to the flowchart of the subroutine of a control section 16, i.e., "change of drive limit positions 2" shown in FIG. 16. Incidentally, the processing of "change of drive limit positions 2" is performed in place of the processing of "change of drive limit positions" shown in FIG. 12. Further, regarding the configurations of an interchangeable lens 2 and a camera body 1, those shown in FIG. 1 can be used as they are.

In step S600 in FIG. 16, the control section 16 calculates a drive amount $\Delta P$ of a focus lens 3 needed to acquire an effective AF evaluation value from the characteristic of the interchangeable lens 2 by using the data stored in the lens data memory 20 in the interchangeable lens 2 such as the focal distance, the image movement amount per unit drive pulse, and the like as parameters. The reference position of the focus lens 3 is set at the infinity side mechanical bump position (see FIG. 8A), and a direction from this position to the closest vicinity side is defined as the normal direction.

In step S601, the control section 16 judges whether or not a value obtained by subtracting the current infinity side drive limit position from the optical infinite distance position is equal to $\Delta P$ or larger. When the value obtained by subtracting the current infinity side drive limit position from the optical infinite distance position is not equal to $\Delta P$ or larger in the judgment of step S601, the control section 16 sets a value obtained by subtracting $\Delta P$ from the optical infinite distance position as a new infinity side drive limit position in step S602.

On the other hand, when the value obtained by subtracting the current infinity side drive limit position from the optical infinite distance position is equal to $\Delta P$ or larger in the judgment of step S601, or after step S602, the control section 16 judges whether or not a value obtained by subtracting the optical closest vicinity position from the current closest vicinity side drive limit position is equal to ΔP or larger. When the value obtained by subtracting the optical closest vicinity position from the current closest vicinity side drive limit position is not equal to ΔP or larger in the judgment of step S603, the control section 16 sets a value obtained by adding ΔP to the optical closest vicinity position as a new closest vicinity side drive limit position in step S604.

Further, when the value obtained by subtracting the optical closest vicinity position from the current closest vicinity side drive limit position is equal to ΔP or larger, or after step S604, the control section 16 terminates the processing of FIG. 16.

Figure 17:
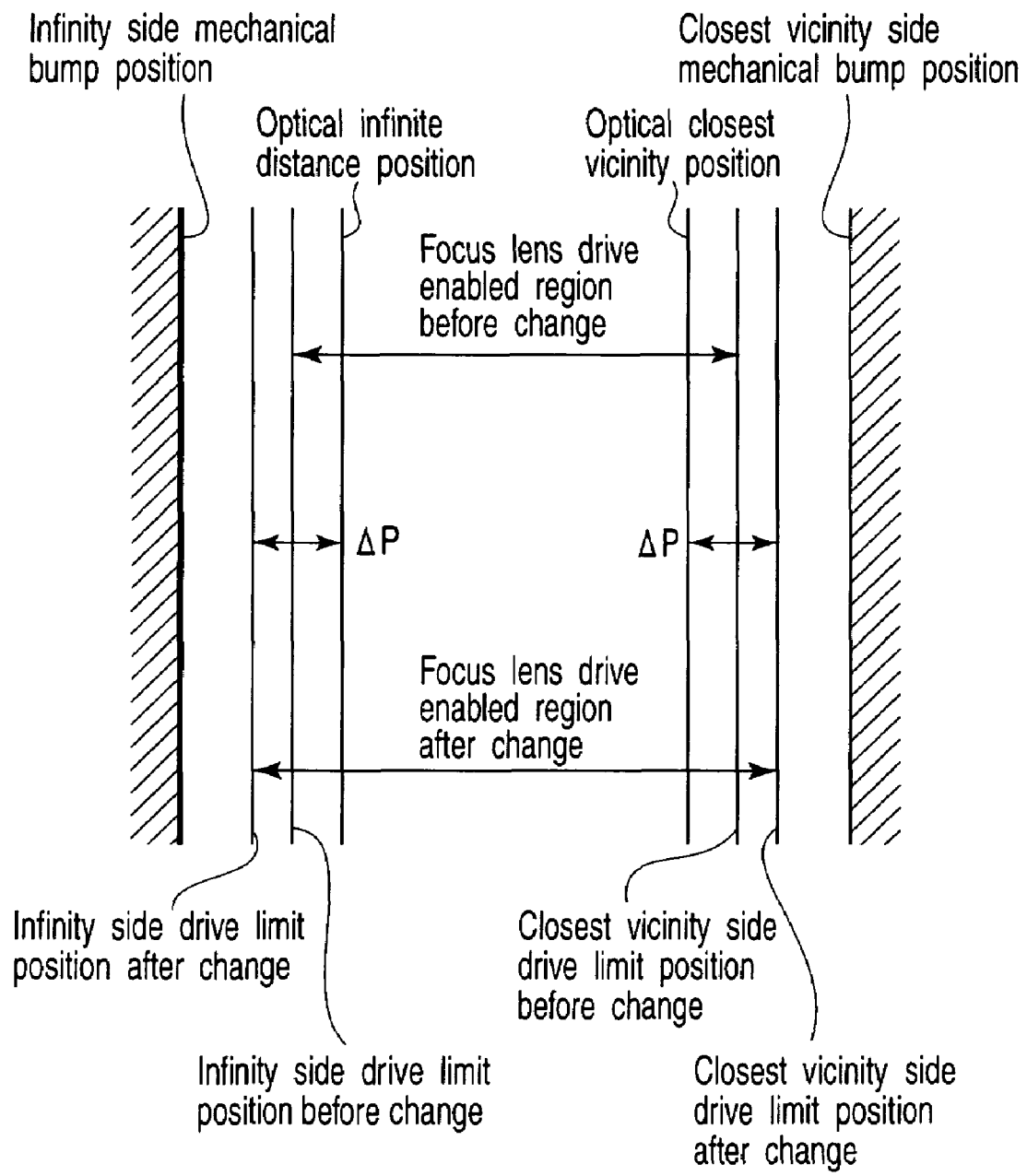
FIG. 17 is a view for explaining changes in an infinity side drive limit position and closest vicinity side drive limit position in the second embodiment.

By the processing of the second embodiment described above, the position obtained by subtracting ΔP from the optical infinite distance position is set as the infinity side drive limit position, and the position obtained by adding ΔP to the optical closest vicinity position is set as the closest vicinity side drive limit position as shown in FIG. 17. As a result of this, it is possible to reduce the possibility of the focus lens 3 reaching the infinity side mechanical bump position or the closest vicinity side mechanical bump position, while extending the drive range of the focus lens 3. Accordingly, it becomes possible to execute highly accurate hill-climbing AF at the infinite distance position or the closest vicinity position, while reducing the possibility of the mechanical structure being damaged by the mechanical bump of the focus lens 3 against the structure.

Other Modification Examples

Modification examples of the first and second embodiments will be described below. When an interchangeable lens 2 is not constituted of metal but is constituted of plastic, the lens frame is deformed due to the environmental temperature, and the infinity side mechanical bump position/closest vicinity side mechanical bump position or the optical infinite distance position/optical closest vicinity position are changed in some cases.

Thus, temperature correction data corresponding to a lens type of an interchangeable lens may be stored in a memory of a control section 16, temperature sensors 22 and 23 may be provided in an interchangeable lens 2 and in a camera body 1, respectively, environmental temperature information may be acquired by the temperature sensors 22 and 23 at the time of AF, and the infinity side/closest vicinity side drive limit positions may be corrected on the basis of the temperature correction data, and the environmental temperature information.

Further, in the first embodiment, even when the focus lens 3 has reached the changed infinity side drive limit position or the closest vicinity side drive limit position, and the focus lens position interval corresponding to ΔP cannot be secured, it is also possible to validate the hill-climbing AF by changing the interpolation method. In the general interpolation processing, the peak position is obtained by performing operation processing by the known linear interpolation on the basis of information on three points (P1, H1), (P2, H2), and (P3, H3) in the AF evaluation value history. In this case, regarding the position of the focus lens 3, the condition of (P1−P2)=(P2−P3) is required. Conversely, in the modification example, even when the condition (P1−P2)≠(P2−P3) is given, the peak position can be calculated by performing interpolation processing by using the known interpolation method such as Lagrange interpolation and the like.

Third Embodiment

Next, a third embodiment of the present invention will be described below. In various interchangeable lenses, some of them have a function by which the photographer intentionally restricts the drive range of the focus lens 3 for the purpose of enhancing the focus adjustment speed. For example, a focus limit switch 21 is provided in an interchangeable lens 2 as an example of a restriction section shown in FIG. 18 in some cases. This focus limit switch 21 is, when a range in which the focus can be adjusted is "from infinite distance position to 2 m (closest vicinity position)" in a telephotographic lens having a focal distance of, for example, 300 mm, an operational member that enables selection of a range in which the focus can be adjusted is "from infinite distance position to 8 m" or "from 8 m to 2 m (closest vicinity position)". Such a focus limit switch 21 is often employed in telephotographic lenses having a relatively long focal distance and macro lenses.

For example, when the subject is located at an infinite distance position, and the focus lens 3 is located at the closest vicinity position, the subject is largely out of focus. At this time, focus detection by the phase difference AF is made impossible, and the time of the focus adjustment becomes long because of performing a so-called lens scan operation. Further, in the case of the same condition, the time necessary for the focus adjustment to reach the peak of the AF evaluation value becomes long even in the hill-climbing AF system. Thus, it is made possible for the photographer to set in advance a drive range of the focus lens 3 corresponding to the subject distance by means of the focus limit switch 21.

The third embodiment is an example in which the present invention is applied to a camera with an interchangeable lens provided with a focus limit switch 21.

Figure 19:
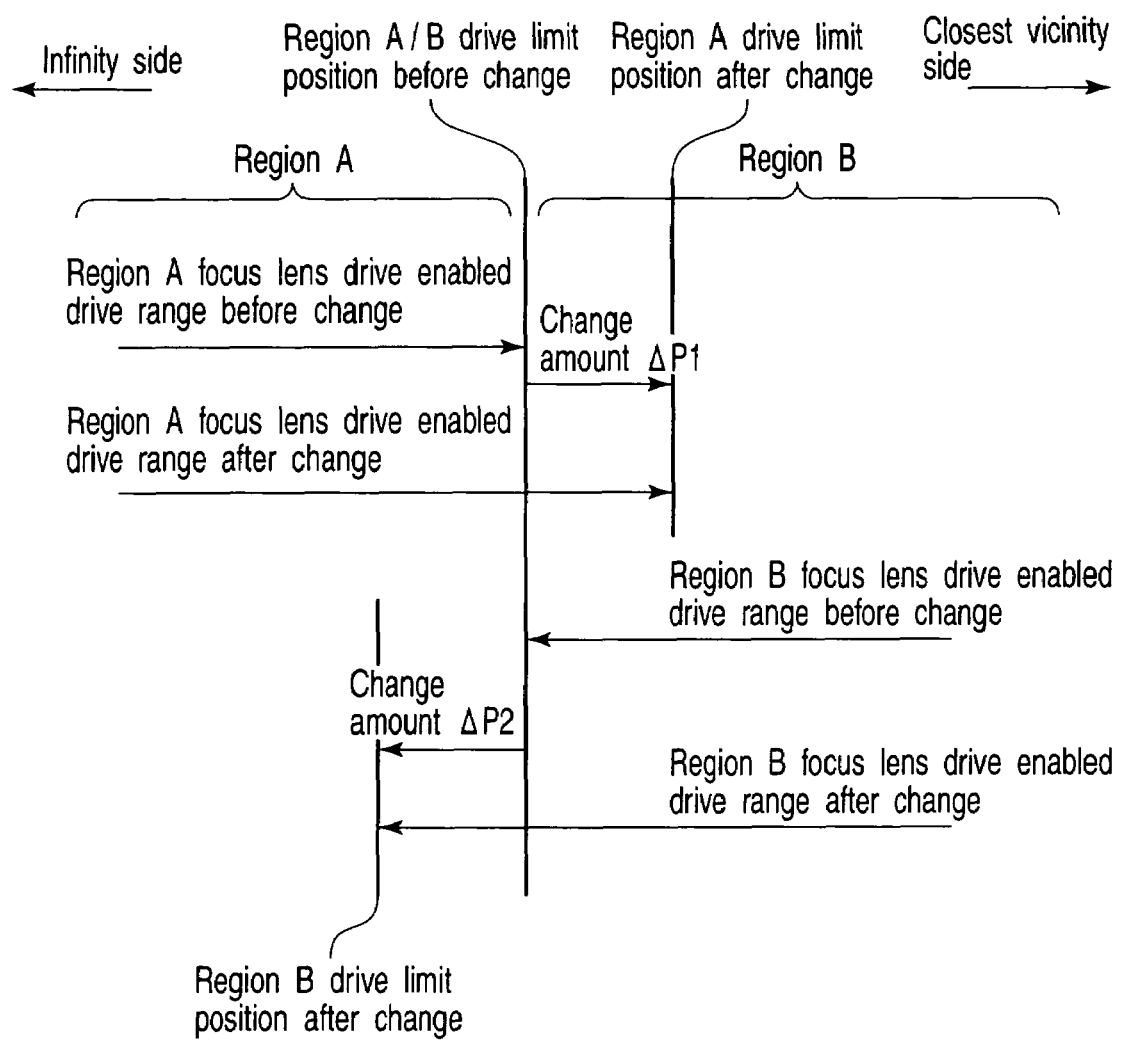
FIG. 19 is a view for explaining a change in a limit position of an intermediate distance in a third embodiment.

In the third embodiment, the drive range of the focus lens 3 is divided into the infinity side (region A) and the closest vicinity side (region B) as shown in FIG. 19. One of the three types of regions, i.e., the normal region between the infinity and the closest vicinity, and the regions A and B in which the drive range of the focus lens 3 is restricted can be selected by means of the focus limit switch 21.

When the hill-climbing AF is to be executed, the drive range of the focus lens 3 is changed so that appropriate hill-climbing AF can be performed even in the vicinity of the border between the regions A and B. More specifically, in the region A, a change amount ΔP1 is added to a region A/B drive limit position before the change to set a region A focus lens drive enabled drive range after the change. Incidentally, regarding the sign, the direction to the closest vicinity is positive. Further, in the region B, a change amount ΔP2 is subtracted from the region A/B drive limit position before the change to set a region B focus lens drive enabled drive range after the change.

FIG. 20 is a flowchart showing an operation of a subroutine "change of drive limit positions 3" corresponding to "change of drive limit positions" of FIG. 12.

In step S700 of FIG. 20, the control section 16 first executes "change of drive limit positions 2" shown in FIG. 16. In subsequent step S701, the control section 16 receives position information on the focus limit switch 21 from the lens control section 5. Further, the control section 16 judges whether or not the focus limit switch 21 is set in one of the region A and the region B. When the focus limit switch 21 is not set in both the region A and the region B, i.e., when the normal region between the infinity and the closest vicinity is set in the judgment of step S701, the control section 16 terminates the processing of FIG. 20.

On the other hand, when the focus limit switch 21 is set in any one of the region A and the region B in the judgment of step S701, the control section 16 calculates focus lens drive amounts ΔP1 and ΔP2 necessary to acquire an effective AF evaluation value from the characteristic of the interchangeable lens 2 by using the data stored in the lens data memory 20 in the interchangeable lens 2 such as the focal distance, the image movement amount per unit drive pulse, and the like as parameters.

In step S703, the control section 16 judges whether or not the focus limit switch 21 is set in the region A. When the focus limit switch 21 is set in the region A in the judgment of step S703, the control section 16 performs the processing of step S704. On the other hand, when the focus limit switch 21 is set in the region B, the control section 16 performs the processing of step S705.

In step S704, the control section 16 sets a value obtained by adding ΔP1 to the region A drive limit position before the change as a region A drive limit position after the change, and terminates the processing of FIG. 20. Further, in step S705, the control section 16 sets a value obtained by subtracting ΔP2 from the region B drive limit position before the change as a region B drive limit position after the change, and terminates the processing of FIG. 20.

As has been described above, in the third embodiment, the hill-climbing AF is executed after the drive limit position of the focus lens 3 is changed. This makes it possible to detect the peak of the AF evaluation value even when the AF evaluation value has a peak in the vicinity of the border between the region A and the region B located midway between the optical infinite distance position and the optical closest vicinity position. Accordingly, it becomes possible to perform the appropriate hill-climbing AF.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An interchangeable lens type digital camera comprising:
   a camera main body including:
      a control section which communicates with an interchangeable lens, and controls focus adjustment of the interchangeable lens by a hill-climbing AF system; and
      a judgment section which judges a characteristic of the interchangeable lens on the basis of communication between the interchangeable lens and the control section,
   an interchangeable lens detachable from the camera main body including:
      a focus lens for performing focus adjustment;
      a focus lens drive section which drives the focus lens; and
      a lens control section which communicates with the control section, and controls the focus lens drive section to perform focus adjustment, wherein
   the control section changes a previously determined drive enabled range of the focus lens on the basis of a judgment result of the judgment section to perform focus adjustment of the interchangeable lens.

2. The interchangeable lens type digital camera according to claim 1, wherein
   the interchangeable lens includes a storage section which stores data associated with the drive enabled range of the focus lens, and
   the control section reads the data associated with the drive enabled range of the focus lens stored in the storage section through the lens control section, and changes the read data associated with the drive range of the focus lens to thereby change the drive enabled range of the focus lens.

3. The interchangeable lens type digital camera according to claim 2, wherein the data associated with the drive enabled range of the focus lens is data associated with an infinite distance position and a closest vicinity position.

4. The interchangeable lens type digital camera according to claim 2, wherein
   the interchangeable lens further includes a mechanical restriction section which mechanically restricts the drive enabled range of the focus lens at positions near the infinity and the closest vicinity positions, and
   the control section restricts, when the changed drive enabled range of the focus lens exceeds a restriction position of the mechanical restriction section, the changed drive enabled range of the focus lens to the restriction position.

5. The interchangeable lens type digital camera according to claim 2, further comprising a focus limit operation setting section by which a drive enabled range of the focus lens is set by a manual operation, wherein
   the data associated with the drive enabled range of the focus lens is data for restricting the drive enabled range of the focus lens set by the focus limit operation setting section.

6. The interchangeable lens type digital camera according to claim 1, wherein
   the interchangeable lens includes a storage section which stores a plurality of types of data associated with the drive enabled range of the focus lens, and
   the control section reads the data associated with the drive enabled range of the focus lens stored in the storage section through the lens control section, and selects a type of data from the plurality of types of read data associated with the drive enabled range of the focus lens to change the drive enabled range of the focus lens.

7. The interchangeable lens type digital camera according to claim 6, wherein the data associated with the drive enabled range of the focus lens is data associated with an infinite distance position and a closest vicinity position.

8. The interchangeable lens type digital camera according to claim 6, wherein
   the interchangeable lens further includes a mechanical restriction section which mechanically restricts the drive enabled range of the focus lens at positions near the infinity and the closest vicinity positions, and
   the control section restricts, when the changed drive enabled range of the focus lens exceeds a restriction position of the mechanical restriction section, the changed drive enabled range of the focus lens to the restriction position.

9. The interchangeable lens type digital camera according to claim 6, further comprising a focus limit operation setting section by which a drive enabled range of the focus lens is set by a manual operation, wherein
   the data associated with the drive enabled range of the focus lens is data for restricting the drive enabled range of the focus lens set by the focus limit operation setting section.

10. The interchangeable lens type digital camera according to claim 1, wherein
    the interchangeable lens includes a storage section which stores a plurality of types of data associated with the drive enabled range of the focus lens, and the control section reads the data associated with the drive enabled range of the focus lens stored in the storage section through the lens control section, and obtains a drive enabled range of the focus lens, by a predetermined calculation, from the plurality of types of read data associated with the drive range of the focus lens to change the drive enabled range of the focus lens to the obtained drive enabled range of the focus lens.

11. The interchangeable lens type digital camera according to claim 10, wherein the control section changes the data associated with the drive enabled range of the focus lens in such a manner that the drive enabled range is extended toward the infinity side and the closest vicinity side.

12. The interchangeable lens type digital camera according to claim 10, wherein the interchangeable lens further includes a mechanical restriction section which mechanically restricts the drive enabled range of the focus lens at positions near the infinity and the closest vicinity positions, and the control section restricts, when the changed drive enabled range of the focus lens exceeds a restriction position of the mechanical restriction section, the changed drive enabled range of the focus lens to the restriction position.

13. The interchangeable lens type digital camera according to claim 10, further comprising a focus limit operation setting section by which a drive enabled range of the focus lens is set by a manual operation, wherein the data associated with the drive enabled range of the focus lens is data for restricting the drive enabled range of the focus lens set by the focus limit operation setting section.

14. The interchangeable lens type digital camera according to claim 1, wherein the camera main body further includes a temperature sensing section which senses an environmental temperature, and the control section reads the data associated with the drive enabled range of the focus lens stored in the storage section through the lens control section, and corrects the read data associated with the drive range of the focus lens on the basis of a temperature sensed by the temperature sensing section, thereby changing the drive enabled range of the focus lens.

15. The interchangeable lens type digital camera according to claim 1, wherein the interchangeable lens further includes a temperature sensing section which senses an environmental temperature, and the control section reads the data associated with the drive enabled range of the focus lens stored in the storage section through the lens control section, and corrects the read data associated with the drive range of the focus lens on the basis of a temperature sensed by the temperature sensing section, thereby changing the drive enabled range of the focus lens.

16. The interchangeable lens type digital camera according to claim 1, wherein the judgment section judges whether the interchangeable lens is an interchangeable lens compatible with the phase difference AF system, or an interchangeable lens compatible with the hill-climbing AF system, or an interchangeable lens compatible with both the phase difference AF system and the hill-climbing AF system, on the basis of communication between the interchangeable lens and the control section.

17. The interchangeable lens type digital camera according to claim 16, wherein the interchangeable lens further includes a storage section which stores the data associated with the drive enabled range of the focus lens, and the control section reads, when it is judged by the judgment section that the interchangeable lens is an interchangeable lens compatible with both the phase difference AF system and the hill-climbing AF system, the data associated with the drive enabled range of the focus lens stored in the storage section through the lens control section, and changes the read data associated with the drive range of the focus lens to thereby change the drive enabled range of the focus lens and perform the hill-climbing AF.

* * * * *